United States Patent
Shapira et al.

(10) Patent No.: US 10,311,118 B2
(45) Date of Patent: *Jun. 4, 2019

(54) SYSTEMS AND METHODS FOR GENERATING SEARCH RESULTS USING APPLICATION-SPECIFIC RULE SETS

(71) Applicant: Samsung Electronics Co., Ltd., Suwon-si, Gyeonggi-do (KR)

(72) Inventors: Liron Shapira, Mountain View, CA (US); Michael Harris, Mountain View, CA (US); Jonathan Ben-Tzur, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/901,341

(22) Filed: Feb. 21, 2018

(65) Prior Publication Data

US 2018/0181669 A1    Jun. 28, 2018

Related U.S. Application Data

(63) Continuation of application No. 15/351,332, filed on Nov. 14, 2016, now Pat. No. 9,916,387, which is a
(Continued)

(51) Int. Cl.
*G06F 16/00* (2019.01)
*G06F 16/9535* (2019.01)
(Continued)

(52) U.S. Cl.
CPC ........ *G06F 16/9535* (2019.01); *G06F 16/334* (2019.01); *G06F 16/9038* (2019.01)

(58) Field of Classification Search
CPC ................................................ G06F 17/30675
(Continued)

(56) References Cited

U.S. PATENT DOCUMENTS

| 7,366,713 | B2 | 4/2008 | Kaluskar et al. |
| 7,421,621 | B1 | 9/2008 | Zambrana |

(Continued)

OTHER PUBLICATIONS

International Search Report and Written Opinion for WO Application No. PCT/US2015/014575 dated Apr. 28, 2015.

*Primary Examiner* — Hanh B Thai
(74) *Attorney, Agent, or Firm* — Jefferson IP Law, LLP

(57) ABSTRACT

A method includes receiving a search query containing one or more query terms from a remote device and determining one or more query parses based on the search query and a knowledge base. Each query parse indicates one or more entity types, wherein each entity type corresponds to a query term or a combination of query terms contained in the search query. The method further includes obtaining a set of app-specific rules, each app-specific rule respectively corresponding to a respective software application. The method further includes generating a set of unparameterized function identifiers based on the plurality of app-specific rules and the one or more query parses. For each of the set of unparameterized function identifiers, the method includes parameterizing the function identifier based on the query terms. The method further includes generating search results based on the parameterized function identifiers and transmitting the search results to the remote device.

20 Claims, 9 Drawing Sheets

Related U.S. Application Data continuation of application No. 14/566,283, filed on Dec. 10, 2014, now Pat. No. 9,495,444.

(60) Provisional application No. 61/937,300, filed on Feb. 7, 2014.

(51) Int. Cl.
*G06F 16/33* (2019.01)
*G06F 16/9038* (2019.01)

(58) Field of Classification Search
USPC .................................. 707/706, 722, 755, 803
See application file for complete search history.

(56) References Cited

U.S. PATENT DOCUMENTS

| | | |
|---|---|---|
| 8,640,017 B1 | 1/2014 | Chang et al. |
| 2003/0115194 A1 | 6/2003 | Pitts et al. |
| 2005/0234878 A1 | 10/2005 | Dettinger et al. |
| 2005/0246304 A1 | 11/2005 | Knight et al. |
| 2006/0085838 A1 | 4/2006 | Samuelsson et al. |
| 2006/0136570 A1 | 6/2006 | Pandya |
| 2007/0022109 A1 | 1/2007 | Imielinski et al. |
| 2007/0112745 A1 | 5/2007 | Dettinger et al. |
| 2007/0112827 A1 | 5/2007 | Dettinger et al. |
| 2007/0112853 A1 | 5/2007 | Dettinger et al. |
| 2007/0226203 A1 | 9/2007 | Adya et al. |
| 2007/0226242 A1 | 9/2007 | Wang et al. |
| 2008/0033940 A1 | 2/2008 | Dinh et al. |
| 2008/0301108 A1 | 12/2008 | Dettinger et al. |
| 2009/0055388 A1 | 2/2009 | Song et al. |
| 2009/0055438 A1 | 2/2009 | Dettinger et al. |
| 2009/0070318 A1 | 3/2009 | Song et al. |
| 2009/0171903 A1 | 7/2009 | Lin et al. |
| 2009/0234814 A1 | 9/2009 | Boerries et al. |
| 2010/0175050 A1 | 7/2010 | Wang et al. |
| 2010/0299741 A1 | 11/2010 | Harrison et al. |
| 2010/0318511 A1 | 12/2010 | Phan et al. |
| 2011/0055221 A1 | 3/2011 | Sovio et al. |
| 2011/0078553 A1 | 3/2011 | Reimann et al. |
| 2011/0088011 A1 | 4/2011 | Ouali |
| 2011/0093491 A1 | 4/2011 | Zabback et al. |
| 2012/0166925 A1 | 6/2012 | Boerries et al. |
| 2012/0284247 A1 | 11/2012 | Jiang et al. |
| 2012/0316955 A1 | 12/2012 | Panguluri et al. |
| 2013/0145348 A1* | 6/2013 | Agovic ................. G06F 8/34 717/120 |
| 2013/0198174 A1 | 8/2013 | Poznanski et al. |
| 2013/0290322 A1 | 10/2013 | Prosnitz et al. |
| 2013/0297590 A1 | 11/2013 | Zukovsky et al. |
| 2014/0109037 A1 | 4/2014 | Ouali |
| 2014/0282136 A1* | 9/2014 | Marantz .............. G06F 3/0484 715/764 |
| 2014/0372466 A1 | 12/2014 | Wong |

\* cited by examiner

SYSTEMS AND METHODS FOR GENERATING SEARCH RESULTS USING APPLICATION-SPECIFIC RULE SETS

CROSS-REFERENCE TO RELATED APPLICATIONS

This application is a continuation application of prior application Ser. No. 15/351,332, filed on Nov. 14, 2016, which claimed priority of U.S. patent application Ser. No. 14/566,283, filed Dec. 10, 2014, now U.S. Pat. No. 9,495,444, which claims the benefit of U.S. Provisional Application No. 61/937,300, filed Feb. 7, 2014. The entire disclosure of each of which is incorporated by reference.

FIELD

This disclosure relates to rules-based generation of search results.

BACKGROUND

Search systems can be utilized in many different fields. Most search systems utilize crawlers to identify content. A search system can index crawled content, such that the search system is able to search the crawled content. Many applications, however, are difficult or impossible to crawl. For instance, social networking applications such as TWITTER® and FACEBOOK® have real-time content feeds. In the case of a real-time content feeds, it is difficult for a crawler to crawl all possible updates to all possible content feeds of an application. Further, even if a crawler were to crawl these content feeds, the relevance of the crawled content diminishes as time passes. Thus, at query time, the most relevant content may not yet be indexed. In another example, some applications allow users to provide different types of search parameters when executing specialized searches. For example, the YELP® application by Yelp, Inc. allows users to enter different attributes (e.g., cost, cuisine type, location, outdoor seating available, etc.) as additional search parameters. This creates a combinatorial explosion of crawlable states of the YELP application due to the vast number of locations and other searchable attributes.

SUMMARY

One aspect of the disclosure provides a method for rules-based generation of search results. The method includes receiving, by a processing system, a search query containing one or more query terms from a remote device and determining, by the processing system, one or more query parses based on the search query and a knowledge base. Each query parse indicates one or more entity types, wherein each entity type corresponds to a query term or a combination of query terms contained in the search query. The method further includes obtaining, by the processing system, a set of app-specific rules, each app-specific rule respectively corresponding to a respective software application. The app-specific rules respectively define a template to generate a function identifier given a set of entity types and instructions defining a manner by which the template is used. The function identifier, when parameterized with one or more values, corresponds to one or more access mechanisms for accessing a state of a specific software application identified by the function identifier, wherein each app-specific rule corresponds to a software application of a plurality of software applications. The method further includes generating, by the processing system, a set of unparameterized function identifiers based on the plurality of app-specific rules and the one or more query parses. For each of the set of unparameterized function identifiers, the method includes parameterizing the function identifier based on the query terms. The method further includes generating, by the processing system, search results based on the parameterized function identifiers and transmitting, by the processing system, the search results to the remote device.

Implementations of the disclosure may include one or more of the following optional features. In some implementations, generating the set of unparameterized function identifiers includes, for each of the query parses, determining, whether the app-specific rule defines a template that accepts one or more of the entity types defined in the query parse. When the app-specific rules define a template that accepts one or more of the entity types defined in the query parse, the method includes generating an unparameterized function identifier based on the entity types accepted by the template. The unparameterized function identifier includes one or more unparameterized parameter fields respectively corresponding to the accepted entity types. In some examples, parameterizing the unparameterized function identifiers includes determining a value with which to populate the unparameterized parameter field based on a subset of the one or more query terms and inserting the value in the unparameterized parameter field. Additionally or alternatively, the method determining the value with which to populate the unparameterized field includes determining the subset of the one or more query terms based on the entity type and determining the value based on the subset of the query terms and the knowledge base.

Determining the value based on the subset of the query terms and the knowledge base includes identifying a slug in the knowledge base corresponding to the subset of query terms. The slug is represented in a format that is understood by the software application to which the app-specific rule and unparameterized function identifier correspond. Additionally or alternatively, the knowledge base may be at least partially structured according to an ontology that associates general entity types with different general entity types based on a relationship between the general entity types, general entity types with one or more general entities of the entity type, general entity types with corresponding application-specific entity types, and application-specific entity types with corresponding application specific entity types. The application-specific entity types define entity types used by a respective software application and the application-specific entities define entities as understood by the respective software application. The slug may be an application-specific entity corresponding to the subset of query terms.

Generating the search results may further include determining a results score for each of the parameterized function identifiers and selecting one or more of the parameterized function identifiers on which to base the search results on. For each selected parameterized function identifier, the method further includes determining one or more access mechanisms based on the selected parameterized function identifier and generating a results object based on the one or more access mechanisms. In some examples, the method further includes identifying, by the processing system, one or more stored function identifiers respectively indicating one or more records from a plurality of records based on the one or more query terms and/or the one or more query parses. Each of the plurality of records respectively corresponds to a state of one of a plurality of software applications and stores information relating to the state of the application and a stored function identifier corresponding to the state of the software application. Generating the search results is further based on the identified stored function identifiers.

In some examples, generating the search results further includes determining a result score for each of the parameterized function identifiers and each of the identified stored function identifiers to obtain a set of scored function identifiers and selecting one or more of the scored function identifiers on which to base the search results on. For each selected function identifier, the method includes determining one or more access mechanisms based on the selected function identifier, generating a result object based on the one or more access mechanisms and including the results object in a container, the container having the search results encoded therein.

Another aspect of the disclosure provides a system for rules-based generation of search results. The search system includes a knowledge base, a plurality of app-specific rules, and a processing system that executes computer-readable instructions. The knowledge base is at least partially structured according to an ontology that associates: general entity types with one or more general entities of the entity type, general entity types with corresponding application-specific entity types, and application-specific entity types with corresponding application specific entity types. The application-specific entity types define entity types used by a respective software application and the application-specific entities define entities as understood by the respective software application. Each app-specific rule of the plurality of app-specific rules respectively correspond to a respective software application. The app-specific rules respectively define a template to generate a function identifier given a set of entity types and instructions defining a manner by which the template is used. The function identifier, when parameterized with one or more values, corresponds to one or more access mechanisms for accessing a state of a specific software application identified by the function identifier. Each app-specific rule corresponds to a software application of a plurality software applications. The computer readable instructions, when executed by the processing system, cause the processing system to receive a search query containing one or more query terms from a remote device determine one or more query parses based on the search query and a knowledge base and generate a set of unparameterized function identifiers based on the plurality of app-specific rules and the one or more query parses. Each query parse indicates one or more entity types, wherein each entity type corresponds to a query term or a combination of query terms contained in the search query. For each of the set of unparameterized function identifiers, the processing system parameterizes the function identifier based on the query terms, generates search results based on the parameterized function identifiers and transmits the search results to the remote device.

This aspect may include one or more of the following optional features. Generating the set of unparameterized function identifiers may include, for each of the query parses, determining whether the app-specific rule defines a template that accepts one or more of the entity types defined in the query parse. When the app-specific rules defines a template that accepts one or more of the entity types defined in the query parse, the system includes generating an unparameterized function identifier based on the entity types defined in the query parse and generating an unparameterized function identifier based on the entity types accepted by the template. The unparameterized function identifier includes one or more unparameterized parameter fields respectively corresponding to the accepted entity types. Parameterizing the unparameterized function identifiers may include for each unparameterized parameter field in the unparameterized function identifier, determining a value with which to populate the unparameterized parameter field based on a subset of the one or more query terms and inserting the value in the unparameterized parameter field.

Determining the value with which to populate the unparameterized field may include determining the subset of the one or more query terms based on the entity type and determining the value based on the subset of the query terms and the knowledge base. Determining the value based on the subset of the query terms and the knowledge base may include identifying a slug in the knowledge base corresponding to the subset of query terms. The slug may be represented in a format that is understood by the software application to which the app-specific rule and the unparameterized function identifier correspond. The slug may be an application-specific entity corresponding to the subset of query terms.

In some examples, generating the search results includes determining a result score for each of the parameterized function identifiers and selecting one or more of the parameterized function identifiers on which to base the search results on. For each selected parameterized function identifier, the system includes determining one or more access mechanisms based on the selected parameterized function identifier and generating a results object based on the one or more access mechanisms.

In some implementations, the storage system further stores a plurality of records. Each of the plurality of records respectively corresponds to a state of one of a plurality of software applications and stores information relating to the state of the application and a stored function identifier corresponding to the state of the software application. The computer-readable instructions, when executed by the processing system, may further case the processing system to identify one or more stored function identifiers respectively indicating one or more records from a plurality of records based on the one or more query terms and/or the one or more query parses, wherein generating the search results is further based on the identified stored function identifiers.

In some examples, generating the search results includes determining a result score for each of the parameterized function identifiers and each of the identified stored function identifiers to obtain a set of scored function identifiers and selecting one or more of the scored function identifiers on which to base the search results. For each selected function identifier, the system includes determining one or more access mechanisms based on the selected function identifier, generating a result object based on the one or more access mechanisms and including the result object in a container, the container having the search results encoded therein. In some examples, the remote device is one of a user device and a partner device, wherein the partner device receives the search query from the user device and provides the search results received from the search system to the user device.

The details of one or more implementations of the disclosure are set forth in the accompanying drawings and the description below. Other aspects, features, and advantages will be apparent from the description and drawings, and from the claims.

BRIEF DESCRIPTION OF THE DRAWINGS

Like reference symbols in the various drawings indicate like elements.

DETAILED DESCRIPTION

Figure 1:
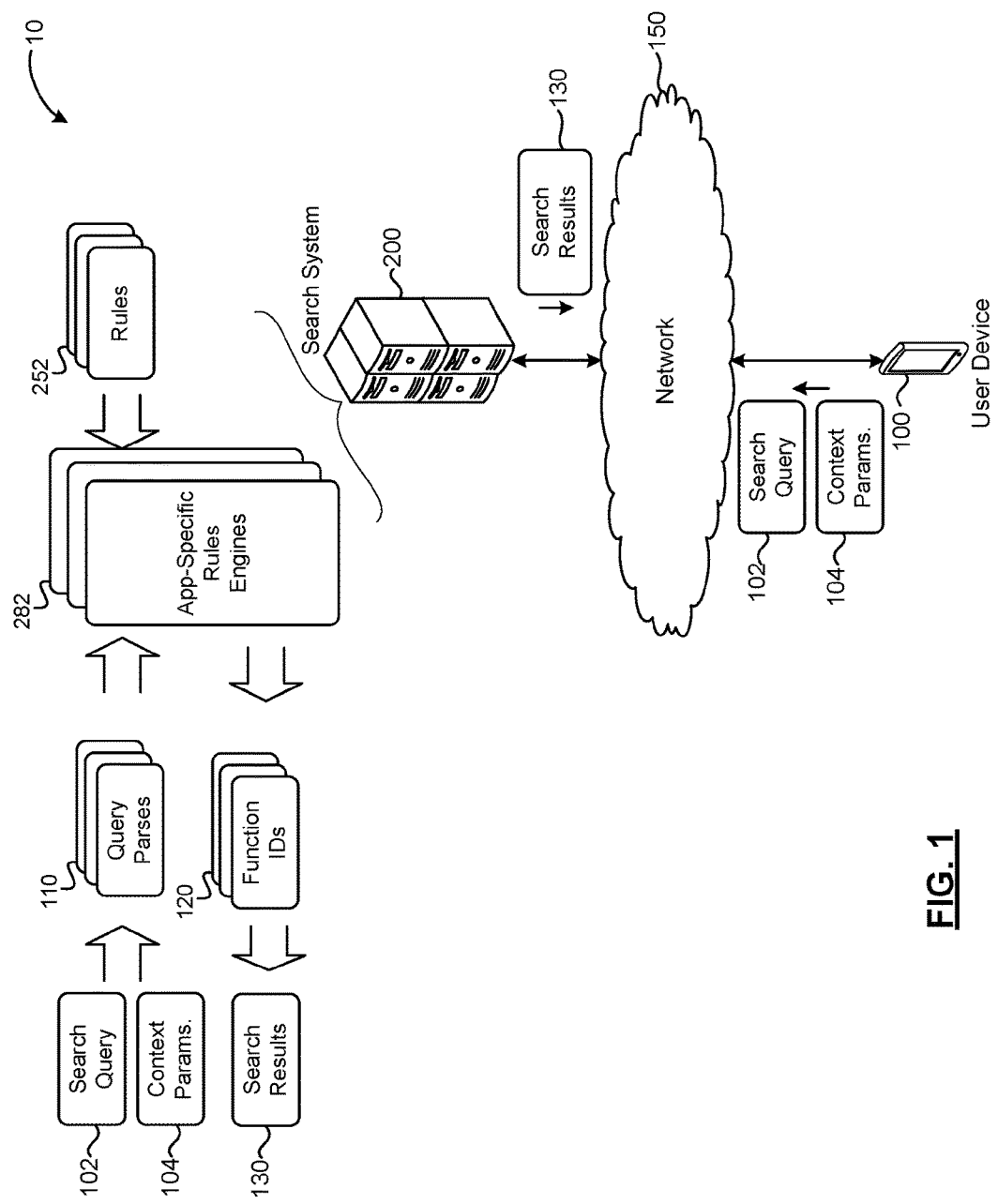
FIG. 1 is a schematic illustrating an example environment of a search system.

FIG. 1 illustrates an example environment 10 of a search system 200. A search system 200 is a collection of computing devices that receives search queries 102 from user devices 100 via a network 150. While the user device 100 is depicted as a smartphone, a user device can be any suitable user computing device including, but not limited to, a tablet computing device, a personal computing device, a laptop computing device, a gaming device, a vehicle infotainment device, and/or a smart appliance (e.g., smart refrigerator or smart television). In response to receiving a search query 102 from a user device 100, the search system 200 generates search results 130 based on the search query 102 and provides the search results 130 to the user device 100. In the illustrated example, the search results 130 can include instructions and data that, when rendered by a user device 100, provide links to one or more states of one or more software applications. The search system 200 may perform any suitable type of searches. For example, the search system 200 may perform web searches (e.g., for content found on websites), application searches (e.g., for applications having particular attributes), and/or application state searches (e.g., for specific states or functions of either native or web applications). The search system 200 is further configured to generate search results 130 that link a user to uncrawled, unknown, and/or unindexed states of a software application.

A state of a software application can refer to a parameterized function of the software application. A software application can perform one or more functions. A function is a service of the software application that can be accessed by a user device 100 via an edition of the software application. Non-limiting examples of functions can include "making a restaurant reservation" (which may parameterized with a restaurant identifier, a date, and a time), "searching for a cuisine" (which may be parameterized with a cuisine type and a location) "view flight prices" (which may be parameterized with departure and arrival airport codes, arrival and departure dates, and round trip flags), "request a driver" (which may be parameterized with a pick-up location), and "view a file" (which may be parameterized with a file identifier). A state of a software application can be accessed from a user device using an edition of the software application. An operating system of a user device 100 can instruct an edition of a software application to access a state of the software application using an access mechanism.

A software application can refer to a software product that causes a computing device to perform a function. In some examples, a software application may also be referred to as an "application," "an app," or a "program." Example software applications include, but are not limited to, productivity applications, social media applications, messaging applications, media streaming applications, social networking applications, and games. Software applications can perform a variety of different functions for a user. For example, a restaurant reservation application can make reservations for restaurants. As another example, an internet media player application can stream media (e.g., a song or movie) from the Internet. In some examples, a single software application can provide more than one function. For example, a restaurant reservation application may also allow a user to retrieve information about a restaurant and read user reviews for the restaurant in addition to making reservations. As another example, an internet media player application may also allow a user to perform searches for digital media, purchase digital media, generate media playlists, and share media playlists. The functions of an application can be accessed using native application editions of the software application and/or web application editions of the software application.

A native application edition (or "native application") is, at least in part, installed on a user device 100. In some scenarios, a native application is installed on a user device 100, but accesses an external resource (e.g., an application server) to obtain data from the external resource. For example, social media applications, weather applications, news applications, and search applications may respectively be accessed by one or more native application editions that execute on various user devices 100. In such examples, a native application can provide data to and/or receive data from the external resource while accessing one or more functions of the software application. In other scenarios, a native application is installed on the user device 100 and does not access any external resources. For example, some gaming applications, calendar applications, media player applications, and document viewing applications may not require a connection to a network to perform a particular function. In these examples, the functionality of the software product is encoded in the native application editions itself. The native application edition is able to access the functions of the software application without communicating with any other external devices.

Web application editions (also referred to as "web applications") of a software application may be partially executed by a user device 100 (e.g., by a web browser executed by the user device 100) and partially executed by a remote computing device (e.g., a web server or application server). For example, a web application may be an application that is executed, at least in part, by a web server and accessed by a web browser (e.g., a native application) of the user device 100. Example web applications may include, but are not limited to, web-based email, online auctions websites, social-networking websites, travel booking websites, and online retail websites. A web application accesses functions of a software product via a network. Example implementations of web applications include webpages and/or HTML-5 application editions.

In some scenarios, a software application may be accessed by one or more native application editions of the software application and/or one or more web application editions of the software application. In these scenarios, there may be overlap between the states or functions that the native application edition(s) can access and the states or functions that the web application edition can access. For example, a restaurant review application may have reviews of thousands of restaurants and may also provide an on-line ordering function from some of the restaurants. The restaurant review application may be accessed by a first native application edition configured for a first operating system (e.g., the ANDROID operating system maintained by Google, Inc.), a second native application edition configured for a second operating system (e.g., the IOS operating system developed by Apple, Inc.), and a web application edition (e.g., a website) of the restaurant review application. The restaurant review application may allow all the editions (native and web) to access the various reviews of restaurants but may only allow on-line orders to be placed using the native application editions. In this way, some states or functions of the restaurant review application cannot be accessed by the web application edition but there is overlap between the states or functions that can be accessed by the native application editions and the web application edition.

A user device 100 can access a state of a software application via an edition of the software application using an access mechanism. When rendering a set of search results 130, a user device 100 displays a set of user selectable links that can be selected by a user of the user device 100. A user selectable link may include one or more underlying access mechanisms. A user selectable link, when selected by a user, causes the user device 100 to access a state of the software application using an edition of the software application identified by the access mechanism.

Examples of access mechanisms can include, but are not limited to, application access mechanisms, web access mechanisms, application download addresses, and scripts. An application access mechanism may be a string that includes a reference to a native application and indicates one or more operations for the user device 100 to perform. If a user selects a user selectable link including an application access mechanism, the user device 100 may launch the native application referenced in the application access mechanism and perform the one or more operations indicated in the application access mechanism. In some implementations, any combination of the operating system of the user device 100, a search application executed by the user device 100, a native application executed by the user device 100, and/or a web browser executed by the user device 100 can launch the native application referenced in the application access mechanism An application resource identifier is an example application access mechanism.

A web access mechanism may be a string that includes a reference to a web application edition of a software product, and indicates one or more operations for a web browser to execute. A web access mechanism may be a resource identifier that includes a reference to a web resource (e.g., a page of a web application/website). For example, a web access mechanism may refer to a uniform resource locator (URL) used with hypertext transfer protocol (HTTP). If a user selects a user selectable link including a web access mechanism, the user device 100 may launch a web browser application and may pass the resource identifier to the web browser. The web browser can utilize the resource identifier to retrieve the web resource indicated in the resource identifier and/or access a function of the software application indicated by the resource identifier.

An application download access mechanism may indicate a location (e.g., a digital distribution platform) where a native application can be downloaded in the scenario where a native application edition of the application is not installed on the user device 100. If a user selects a user selectable link including an application download access mechanism, the user device 100 may access a digital distribution platform from which the referenced native application edition may be downloaded. The user may opt to download the native application edition. Upon doing so, the user device 100 may launch the native application edition and may access the state of the software application using the native application edition and an application access mechanism associated with the user selectable link.

A script is a set of instructions, that when executed by the user device 100 cause the user device to access a resource indicated by the script. For example, the script may instruct an operating system of the user device 100 to launch the native application, and may define one or more additional instructions to access a particular state of the application. Another type of access mechanisms may include scripts, which may be used instead of other type of access mechanism when an edition of a software application is not configured to be referenced by the other types of access mechanisms.

In operation, the search system 200 receives a search query 102 and, in some implementations, one or more context parameters 104. The search query 102 includes one or more query terms. A context parameter 104 is additional information that may be included with the search query 102, such as a geolocation of the user device 100 at the time of the search query 102, an operating system type of the user device 100, or an identifier of the user of the user device (e.g., a username or profile ID). In some implementations, the user device 100 generates a query wrapper that contains the search query 102 and the context parameter(s) 104. The user device transmits the search query 102 and zero or more context parameters 104 to the search system 200.

In some implementations, the search system 200 generates one or more query parses 110 based on the search query 102 and/or the query parameters 104. A query parse 110 is an interpretation of the search query 102 that indicates potential entity types of entities implicated by the query terms contained in the search query 102. An entity is a value (e.g., a noun or a number) known to the search system 200. An entity type is a classification of the value. For example, the query term "lax" may be a known entity. The potential entity types of "lax" may be "airport code" and "sport." Additionally, a query parse 110 may indicate an entity score for each identified potential entity type. The entity score of a potential entity type indicates a likelihood that a query term or combination of query terms corresponds to the potential entity type. In some implementations, the search system 200 generates a parse tree that indicates the one or more query parses 110. In these implementations, the leaf nodes of the parse tree represent the query parses 110 and the intermediate nodes and root node represent logical operators (e.g., AND or OR operators).

The search system 200 includes a rules-based module 218 that receives the one or more query parses 110 and generates one or more function identifiers 120 ("function IDs") based on the query parses 110 and one or more app-specific rules 252. In some implementations, a function ID 120 is a string of alphabetic, numeric, and/or symbolic characters (e.g., punctuation marks) that uniquely identifies a state of an application. Put another way, a function ID 120 is a unique reference to a state of an application. In some implementations, a function ID 120 can be in the format of a resource identifier. For example, the function ID 120 may be a uniform recourse locator (URL) or an application resource identifier. In these implementations, the function ID 120 may be used by a user device to access a software application via a web application edition or one or more native application editions of the software application, respectively. In some implementations, a function ID 120 can map to one or more access mechanisms. In these implementations, a function ID 120 may map to a web resource identifier (e.g., a URL), one or more application resource identifiers, and/or one or more scripts. For instance, a state of an example software application, "exampleapp," may be accessed via a web application edition and two native application editions (e.g., an edition configured for the ANDROID operating system and an edition configured for the WINDOWS PHONE operating system). In this example, the web resource identifier may be: www.exampleapp.com/param1=abc¶m2=xyx, the first application resource identifier may be android.exampleapp::param1=abc¶m2=xyx, and the second application resource identifier may be windows.exampleapp::param1=abc¶m2=xyx. In this example, a function ID 120 may map to the web resource identifier and the two application resource identifiers. A function ID 120 may have a URL-like structure that utilizes a namespace other than http://, such as "func://" which indicates that the string is a function ID 120. In the example of "exampleapp" above, the function ID 120 corresponding to the example state may be func://exampleapp::param1=abc¶m2=xyx which maps to the access mechanisms described above. In another example, a function ID may take the form of a parameterizable function. For instance, a function ID may be in the form of "app_id[action(parameter_1, . . . , parameter_n)]", where app_id is an identifier (e.g., name) of a software application, action is an action that is performed by the application (e.g., "view menu"), and parameter_1 . . . parameter_n are n parameters that the software application receives in order to access the state corresponding to the action and the parameters. Drawing from the example above, a function ID 120 may be "exampleapp[example_action(abc, xyz)]". Given this function ID 120 and the referencing schema of the example application, the foregoing function ID 120 may be used to generate the access mechanisms defined above. Additionally or alternatively, the above example function ID 120 may map to the access mechanisms defined above. Furthermore, while function IDs 120 have been described with respect to resource identifiers, a function ID 120 may map to one or more scripts that access a state of a software application or may be utilized to generate one or more scripts that access a state of the software application. It is noted that some software applications may have a common scheme for accessing all of their respective native application editions. In such scenarios, a single application resource identifier may access multiple application editions. Further, a function ID 120 may take any other suitable format. For example, the function ID 120 may be a human-readable string that describes the state of the application to which the function ID 120 corresponds.

In some implementations, the search system 200 may utilize a set of app-specific rules 252 to generate function IDs 120. An app-specific rule 252 is a set of computer readable instructions that defines one or more templates for accessing a state of an application and instructions defining a manner by which a function ID 120 is generated given the template and a set of entities (defined in, for example, a query parse). In some implementations, an app-specific rule 252 is specific to an application and is encoded in a file (e.g., a .json file). In some implementations, the rules-based module 218 includes one or more app-specific rules-based modules 282. An app-specific rules-based module 282 receives the one or more query parses 110 and generates one or more function IDs 120 that are specific to a corresponding software application. An app-specific rules-based module 282 accesses the app-specific rules 252 that are specific to the software application corresponding to the app-specific rules-based module 282. In this way, each app-specific rules-based module 282 generates function IDs 120 that can be used to access a state of its corresponding software application. As previously discussed, the function IDs 120 may be access mechanisms in and of themselves or may map to one or more access mechanisms. In the latter scenario, a function ID 120 can be used to lookup the corresponding access mechanisms or to generate one or more access mechanisms. Thus, given a set of query terms and/or entities, and a set of entity types of the query terms and/or entities, an app-specific rules-based module 282 can generate function IDs 120 that can access its corresponding software application, provided the software application receives parameters corresponding to the entity types defined in a query parse 110.

The rules-based module 218 outputs the function IDs 120. The search system 200 utilizes the function IDs 120 to generate search results 130. The search results 130 may incorporate the function IDs 120 output by the rules-based module 282 and/or function IDs 120 derived from other sources. For instance, the search system 200 may search a set of records (e.g., record 262 in FIGS. 2A and 2D) to identify a set of function IDs 120 that correspond to states of software applications that the search system 200 previously crawled and indexed. In these implementations, the search system 200 searches the collection of records given the search query 102, the context parameters 104, and/or the query parses 110 to identify a corresponding set of function IDs 120. The search system 200 can score and rank all of the identified and/or generated function IDs 120 and can generate search results 130 based on the scored and ranked function IDs 120.

By including the rules-based module 218 that generates app-specific function IDs 120 in the search system 200, the search system 200 can generate search results 130 that deep-link to a number of uncrawlable software applications. For instance, software applications that do not have corresponding web applications, that have voluminous amounts of dynamic real-time content, and/or that have numerous search attributes to choose from may be deep-linked to from a third party search system 200. Furthermore, the framework described above makes it possible to deep link to third-party software applications.

Figure 2A:
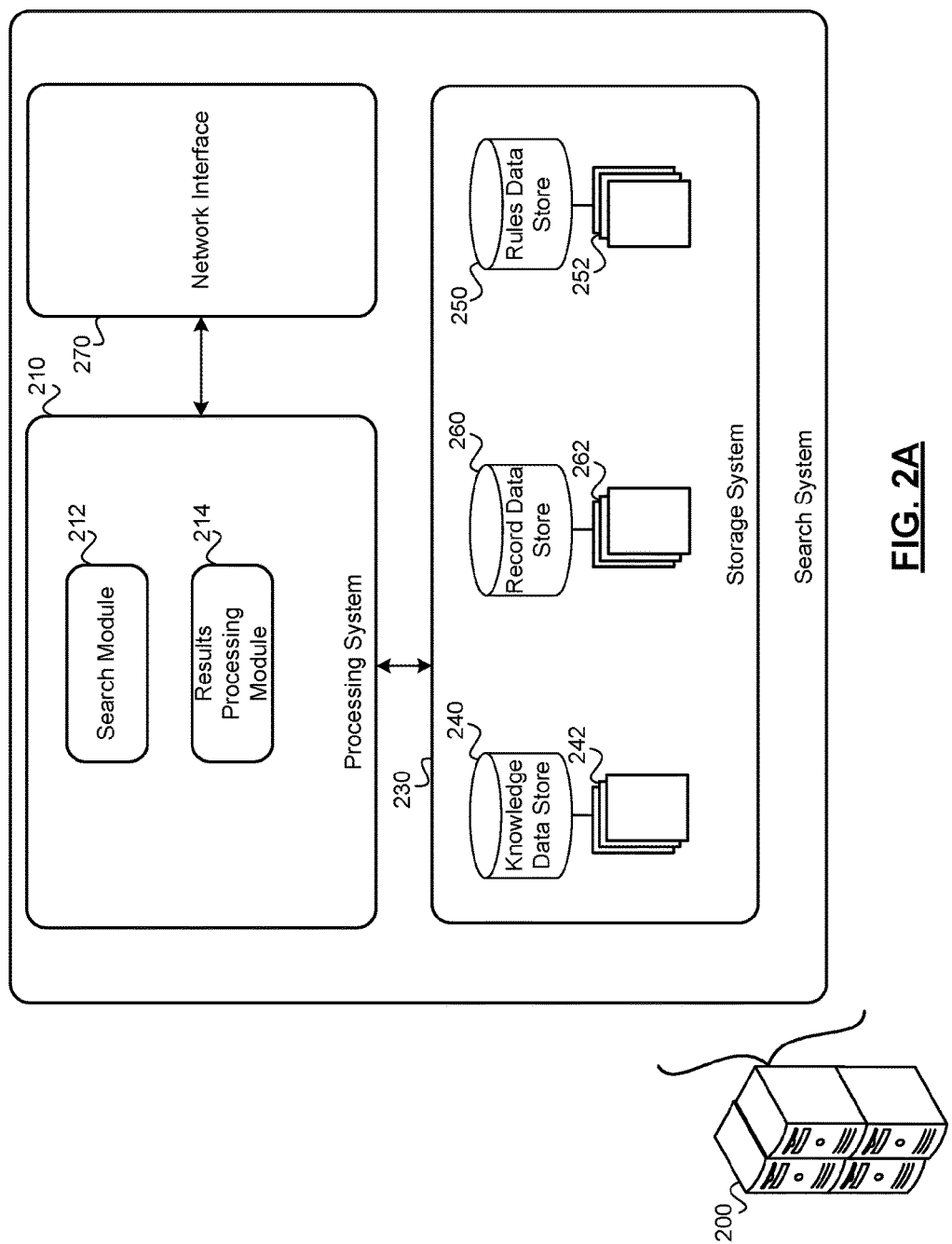
FIG. 2A is a schematic illustrating example components of a search system.

FIGS. 2A-2F illustrate example implementations of a search system 200 and data flows thereof. FIG. 2A illustrates an example set of components of a search system 200. In the illustrated example, the search system 200 includes a processing system 210, a storage system 230, and a network interface 270. The components depicted in FIG. 2A are provided for example, and the search system 200 may include any other suitable components. The components may be interconnected, for example, by a bus and/or any other form or medium of digital data communication, e.g., a communication network 150.

The processing system 210 is a collection of one or more processors that execute computer readable instructions. In implementations having two or more processors, the two or more processors can operate in an individual or distributed manner. In these implementations, the processors may be connected via a bus and/or a network. The processors may be located in the same physical device or may be located in different physical devices. The processing system executes a search module 212 and a results processing module 214.

The network interface device 270 includes one or more devices that perform wired or wireless (e.g., Wi-Fi or cellular) communication. Examples of the network interface devices include, but are not limited to, a transceiver configured to perform communications using the IEEE 802.11 wireless standard, an Ethernet port, a wireless transmitter, and a universal serial bus (USB) port.

The storage system 230 includes one or more storage devices. The storage devices may be any suitable type of computer readable mediums, including but not limited to read-only memory, solid state memory devices, hard disk memory devices, and optical disk drives. The storage devices may be connected via a bus and/or a network. Storage devices may be located at the same physical location (e.g., in the same device and/or the same data center) or may be distributed across multiple physical locations (e.g., across multiple data centers). The storage system 230 stores a knowledge data store 240, a rules data store 250, and a record data store 260. Example contents of the respective data stores 240, 250, 260 are discussed in detail below.

Figure 2B:
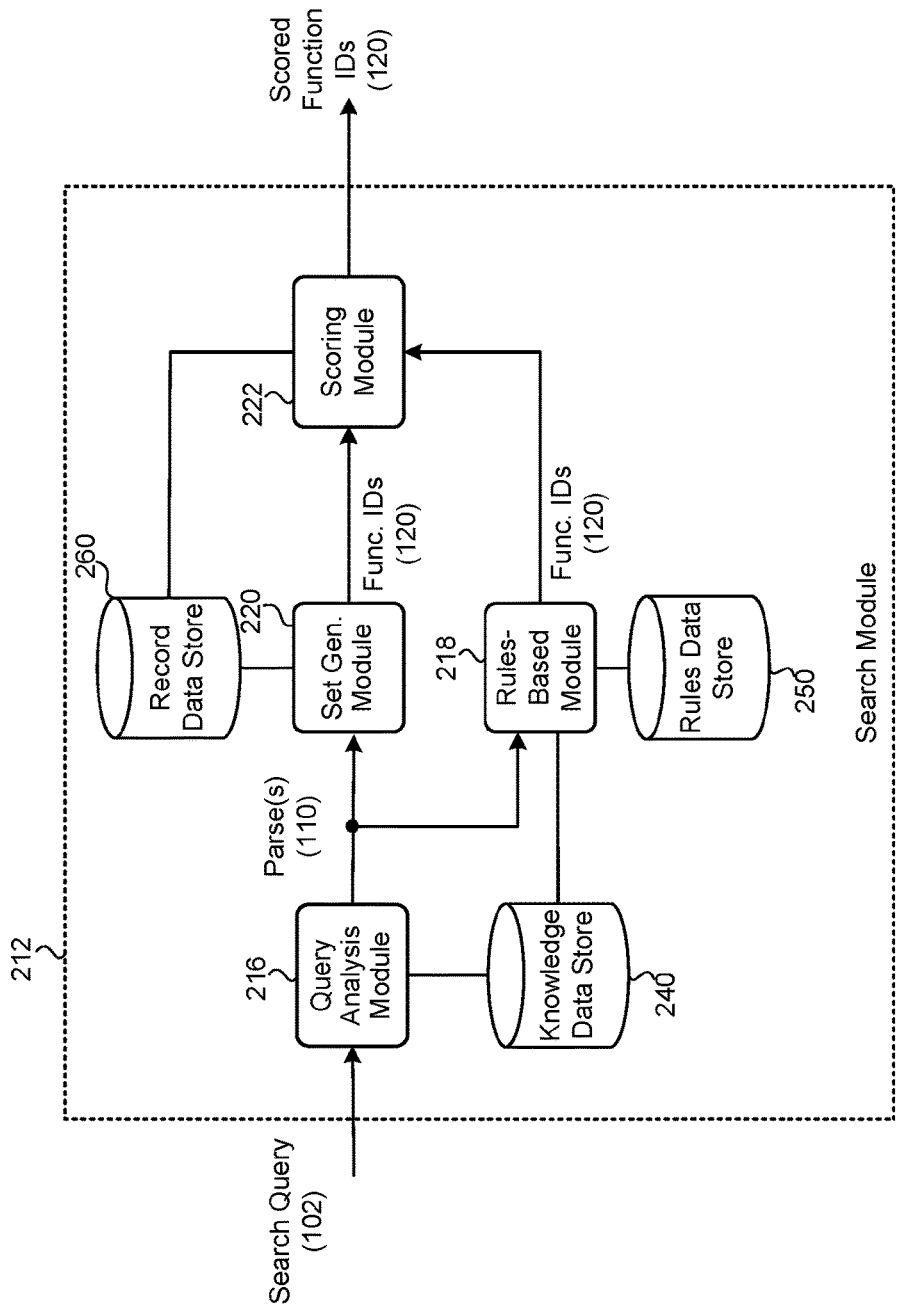
FIG. 2B is a schematic illustrating example components of the search module and a data flow thereof.

FIG. 2B illustrates example components of the search module 212 and a data flow thereof. The example search module 212 includes a query analysis module 216, a rules-based module 218, a set generation module 220, and a scoring module 222. In some implementations, the query analysis module 216 receives a search query 102 and generates one or more query parses 110 based on the search query 102 and the contents of the knowledge data store 240. The rules-based module 218 receives the query parses 110 and generates one or more function IDs 120 using a set of app-specific rules 252. In this example, the set generation module 220 receives the query parses 110 (or the search query 102 and context parameters 104) and identifies a consideration set of records (represented by a function IDs) based on query parses 110. The scoring module 222 receives function IDs 120 generated by the rules-based module 218 and/or identified by the set generation module 220. For purposes of explanation, function IDs 120 generated by the rules-based module 218 (or a similar component) may be referred to as "generated function IDs" 120 and function IDs identified by the set generation module 220 (or a similar component) may be referred to as "identified function IDs" 120. The scoring module 222 scores the function IDs 120 and outputs the scored function ID 120 to the result processing module 214.

The query analysis module 216 receives the search query 102 and possibly one or more context parameters 104 and outputs one or more query parses 110 based upon the search query 102, the knowledge data store 240, and in some implementations, the one or more context parameters 104. A query parse 110 is a data structure that defines a possible interpretation of the search query 102. The query parse 110 may be structured in a parse tree. In some implementations, the parse tree is a structure where a leaf node contains a query term or combination of query terms, a potential entity type of the query term or combination of query terms, and an entity score. In these implementations, the intermediate nodes above the leaf nodes define logical operators (e.g., OR or AND). A query parse 110 may be represented in any other suitable manner. In a first example, a search query 102 may be "jfk lax." In this example, "jfk" may be an airport code (John F. Kennedy International Airport in New York, N.Y.) or the initials of former United States President John F. Kennedy, while "lax" may be an airport code (Los Angeles International Airport) or an abbreviation of the name of a sport (lacrosse). In this example, the user may be searching for airplane tickets between LAX and JFK, an article about former President Kennedy being a lacrosse player, or information on a high school lacrosse team (e.g., JFK High School). Of these, the most likely is the travel related search query 102. Thus, the entity scores of the airport entity type (LAX and JFK) are likely to be much higher than the entity scores of other entity types (e.g., sport or high school). In this example, the query analysis module 216 can output three (or more) query parses 110. A first query parse 110 can identify the query terms, "lax" and "jfk," and can assign the entity type "airport code" to each query term and can determine an entity score for each assignment (e.g., 0.8 that lax is an airport code and 0.7 that jfk is an airport code). A second query parse 110 can identify the query terms, "lax" and "jfk," and can assign the entity type "sport" to "lax," the entity type "person" to "jfk," and an entity score to each respective assignment (e.g., 0.15 that lax is a sport and 0.25 that "jfk" is a person). A third query parse 110 can assign the entity type of "high school" to "jfk," the entity type sport to "lax," and entity scores to each respective entity type assignment. In some implementations, these query parses 110 may be represented in a parse tree (e.g., each individual query parse 110 is represented by one or more leaf nodes and connected to the other query parses 110 with an OR node).

The query analysis module 216 determines the query parses 110 by leveraging a knowledge base 242 stored in a knowledge data store 240. In some implementations, the knowledge base 242 includes one or more entity tables and a set of parsing rules defining manners by which to parse the query. In these implementations, an entity table is a lookup table that relates a term or combination of terms to the possible entity types of the term or combination of terms. Each relation can also have an associated entity score that is a probability value that indicates a likelihood that the term is of that entity type. The entity scores can be determined, for example, heuristically by analyzing large sets of text and documents. The parsing rules can define semantic rules that instruct a parser how to parse a search query 102 and to draw inferences based on the results of parsing.

Figure 2C:
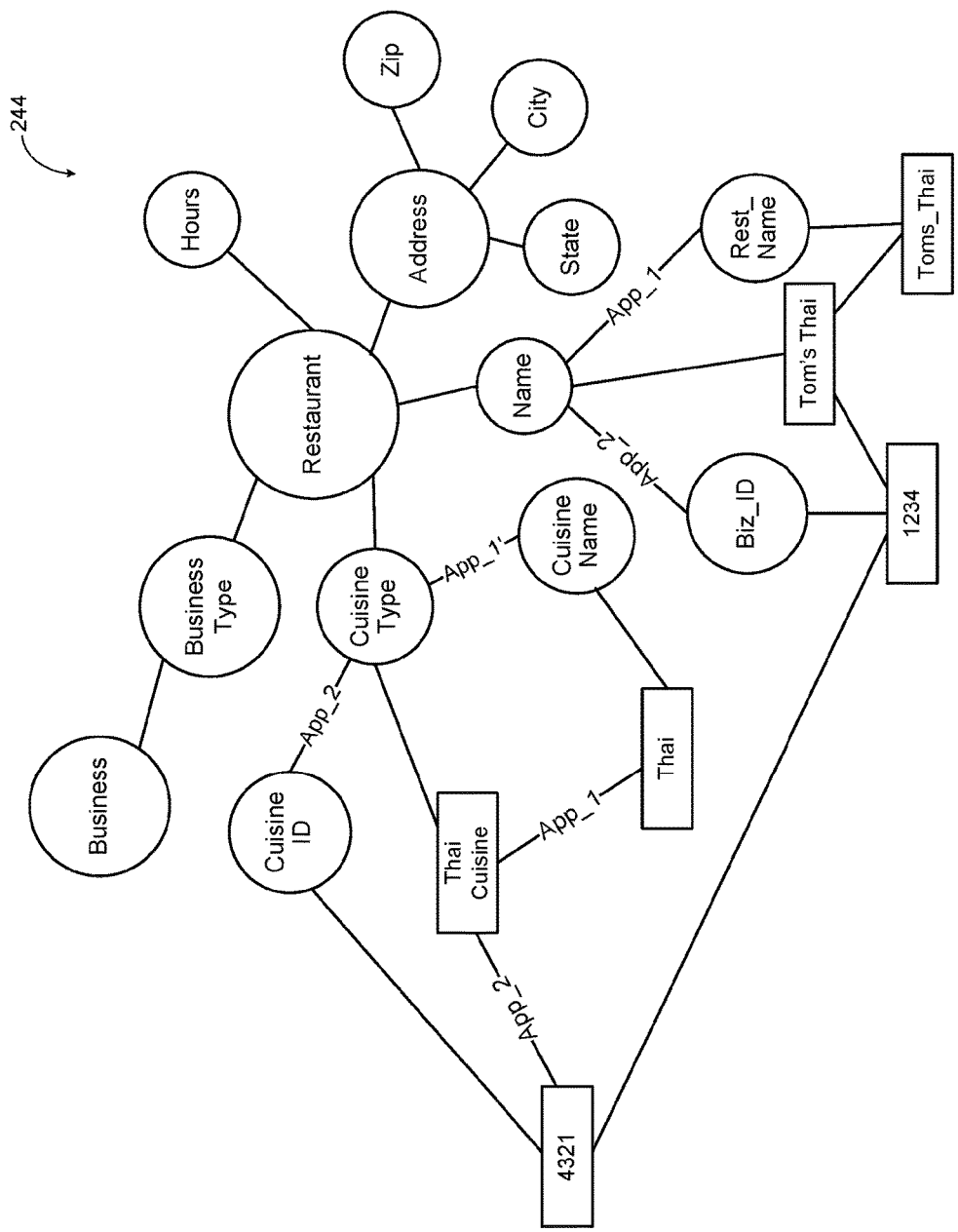
FIG. 2C is a schematic illustrating an example portion of an example knowledge base.

The knowledge base 242 can include any other additional or alternative data structures. For example, in some implementations the knowledge base 242 is structured in accordance with an ontology. FIG. 2C illustrates an example of an ontology 244. The ontology 244 may define a formal framework for expressing relationships between different items in the knowledge base 242. The ontology 244 may define relationships between general entity types to app-specific entity types. For example, the cuisine "Thai cuisine" general entity type may relate to a "Thai" app-specific entity type for a first software application and "Thai food" app-specific entity type for a second software application. In this way, the first software application's schema refers to "Thai cuisine" as "Thai" and the second software application's schema refers to "Thai cuisine" as "Thai food." Furthermore, entity types may relate to other entity types. For example, the general entity type "Thai cuisine" may reference an "Asian cuisine" entity type as Thai cuisine may be thought of as a subclass of "Asian Food." Further, the "restaurant" entity type may relate to an "address" entity type, a "cuisine" entity type, and any other relevant classifications. An "address" entity type may include a "street address" entity type, a "state" entity type, a "city" entity type, and a "zip" entity type. The knowledge base 242 includes data points that populate the ontology. For example, the string "Thai" may be related to the "Thai cuisine," while the string "Tom's Thai" may relate to "Thai cuisine" entity type and "restaurants" entity type. As the search system 200 learns about new entities, the search system 200 can connect the new entity to its corresponding entity types. In this way, the knowledge base 242 indicates how an entity relates to other entities and the entity type(s) of the entity given the ontology 244. For instance, the entity "Tom's Thai" may be linked to a state entity "California," a city entity "Mountain View," and a zip code entity "94040." As will be discussed, a search query 102 including the query terms "tom's thai" that was received from a location near Mountain View, Calif. would likely be interpreted as implicating the "Tom's Thai" entity. Furthermore, as the ontology also includes app-specific entities, the search system 200 is able to represent the restaurant name "Tom's Thai" in a manner that is understood by third party applications (e.g., "1234" for a first application and "Toms_Thai" for a second application). In some implementations, the ontology 244 and its corresponding data points (i.e., the specific entities), may be indexed and stored in the knowledge base 242. For example, the search system 200 may index the ontology and corresponding data points into one or more entity tables. In these implementations, components of the search system 200 can query the entity tables with a query term, and if the query term (or combination of query terms) is listed in the entity table as an entity, the entity table returns to potential entity type(s) of the query term (or query terms).

In some implementations, the query analysis module 216 includes one or more parsers that implement the parsing rules and utilize the entity tables and/or the populated ontology 244 to identify potential entity types and determine corresponding entity scores. For example, the query analysis module 216 may include a restaurant parser that parses the search query 102 to identify restaurant names, a cuisine parser that parses the search query 102 to identify cuisine names, a media parser that parses the search query 102 to identify media related terms (e.g., song titles, movie titles, album titles), a person parser that parses the search query 102 to identify names of people, an action parser that parses the search query 102 to identify names of actions (e.g., "read," "watch," "view," "make reservation,"), a place name parser that parses the search query 102 to identify names of places, an airport parser that parses the search query 102 to identify airport names or airport codes, a time parser that parses the search query 102 to identify dates and times, and an application name parser that parses the search query 102 to identify names of applications. Non-limiting example implementations of a non-limiting set of example parsing rules are provided in Appendix A. The parsing rules may define language constructs that clue the query analysis module 216 as to the intention of the user. For example, a parsing rule may instruct the query analysis module 216 to identify stop words such as "to" or "in" when parsing the search query 102 to determine whether a query term or combination of query terms is a place name (e.g., "Thai restaurants in Mountain View" or "taxi to Detroit"). When such a stop word is identified, the parser can look up the query term(s) following the stop word in an entity table that defines place names. If the query term(s) are in the entity table, the entity type defined in the table is assigned to the query term(s) as a potential entity type and the entity score defined in the entity table is assigned to the potential entity type. In another example, a parsing rule may instruct a parser to analyze the search query 102 for particular action terms such as "watch," "view," "stream," or "read." When the parser encounters one of these action words, the parsing rules can instruct the parser to compare the query term(s) against an entity table that defines media and book titles. In the event a media or book title follows the action word, the parser can assign the entity type (e.g., "movie" or "book") to the query term(s) following the action word and can assign the entity score defined in the entity table to the entity type. In the event two different constructions of a search query 102 exist, the query analysis module can create query parses 110, whereby the different query parses 110 the different interpretations of the search query 102. For instance, if the search query 102 is "lax," the user may be referencing the sport or the airport. In this instance, the query analysis module 216 may create a query parse 110 that represents a query directed to an airport and a query parse 110 that represents a query directed to a sport. In some implementations, the query analysis module 216 can connect the query parses 110 with an intermediate node (OR), thereby generating a parse tree 110. The query analysis module 216 outputs the query parses 110 to the rules-based module 218 and the set generation module 220.

The rules-based module 218 receives one or more query parses 110 and outputs function IDs 120 based on the query parses 110. The rules-based module 218 utilizes a set of app-specific rules 252 to generate the function IDs 120. In some implementations, an app-specific rule 252 defines one or more templates for generating a function ID 120 and one or more instructions for utilizing the template. In some of these implementations, the app-specific rule 252 are encoded in a file, such as a .json file, and is specific to a software application. A software application may have one or more app-specific rules 252 corresponding thereto.

Figure 2D:
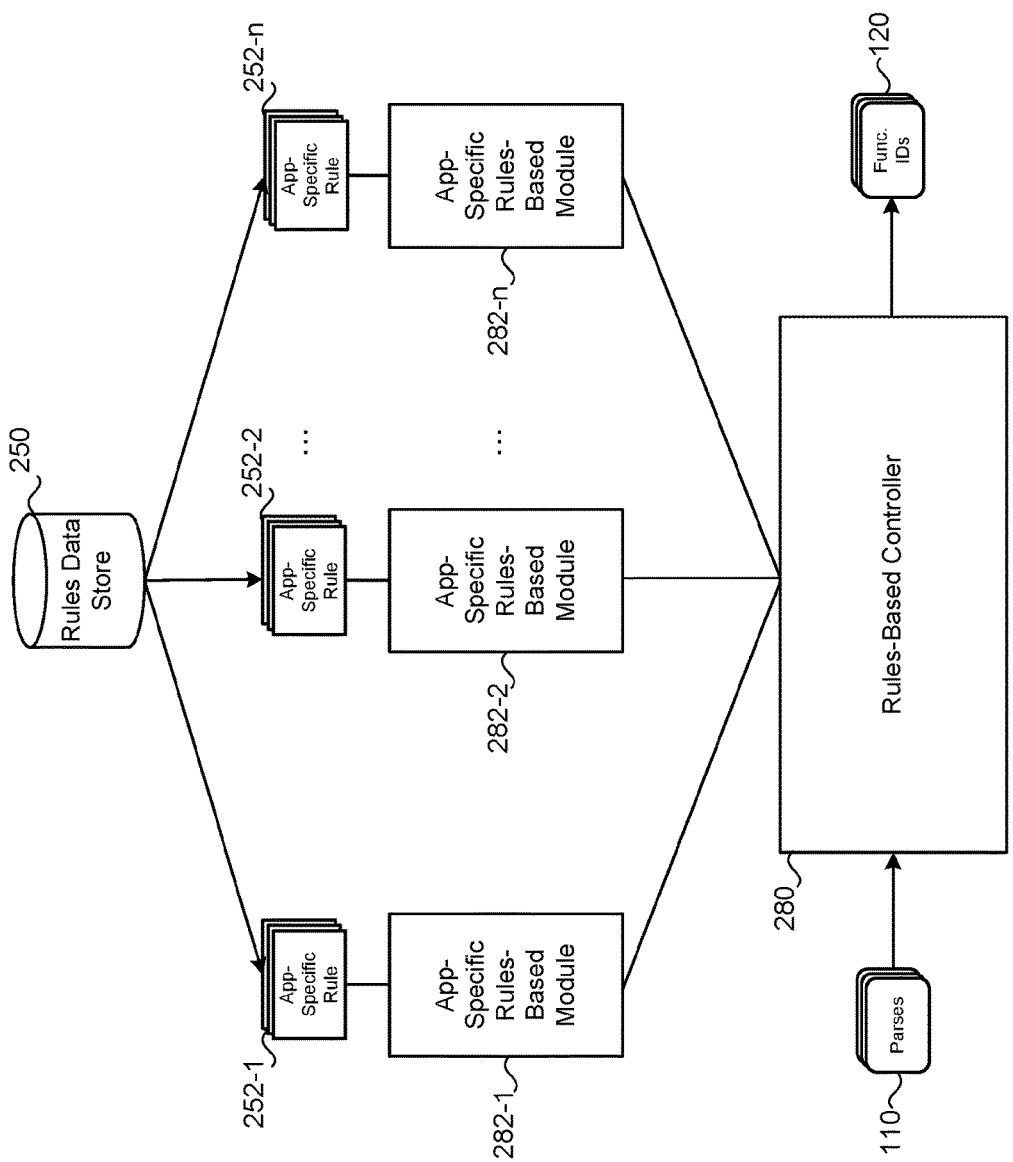
FIG. 2D is a schematic illustrating example components of a rules-based module.

FIG. 2D illustrates an example implementation of the rules-based module 218. In the illustrated example, the rules-based module 218 includes a rules-based controller 280 and a plurality of app-specific rules-based modules 282 (e.g., app-specific rules-based modules 282-1, 282-2, . . . , 282-n). Each app-specific rules-based module 282 utilizes a set of app-specific rules 252 that define templates specific to a specific software application. Each app-specific rules-based module 282 generates function IDs 120 to access a respective software application. Each set of app-specific rules 252 are configured specifically to generate function IDs 120 for a corresponding software application. For example, a first app-specific rules-based module 282-1 may utilize a first set of app-specific rules 252 to generate function IDs 120 that can be used to access specific functions of a first software application, while a second app-specific rules-based module 282-2 may utilize a second set of app-specific rules 252-2 to generate function IDs 120 that can be used to access specific functions of a second software application. As different software applications receive different parameters (e.g., parameters corresponding to different entity types) and in accordance with different schemas, app-specific rules 252 configured to generate function IDs 120 for a first software application will differ than app-specific rules 252 configured to generate function IDs 120 for a second software application. The app-specific rules 252 may be manually generated by a developer (e.g., a developer affiliated with the search system 200 or with the third-party software application) and/or may be learned by a component of the search system 200.

The rules-based controller 280 receives one or more query parses 110 and distributes the query parses 110 to the individual app-specific rules-based modules 282. In some implementations, the rules-based controller 280 distributes the query parses 110 to each individual app-specific rules-based module 282. In these implementations, each app-specific rules-based module 282 respectively determines whether it can process the query parses 110, as discussed in greater detail below. In other implementations, the rules-based controller 280 determines which app-specific rules-based modules 282 can process a query parse 110 based on the entity types defined in the query parse 110. For example, a search query 102 containing the term "lax" may be parsed into a first query parse 110 listing an airport code as a potential entity type and a second query parse 110 listing a sport as a potential entity type. In this example, the controller 280 can provide the first query parse 110 to app-specific rules-based modules 282 of travel related applications and can provide the second query parse 110 to app-specific rules-based modules 282 of sports related applications and/or retail related applications (e.g., applications that allows users to purchase lacrosse equipment), but not the former app-specific rules-based modules 282.

An app-specific rules-based module 282 receives a query parse 110 (or multiple query parses 110) and generates zero or more function IDs 120 based on the query parse 110 and one or more app-specific rules 252. In some implementations, the app-specific rules 252 are stored in a rules data store 250. An app-specific rule 252 is accessed by a corresponding app-specific rules-based module 282. Put another way, app-specific rules 252 are specific to a software application, and thus, are utilized by an app-specific rules-based module 282 that generates function IDs 120 for accessing the software application. The app-specific rules 252 define the manner by which the app-specific rules-based module 282 generates a function ID 120, including the parameter fields that are used to generate the function ID. As previously discussed, a query parse 110 identifies a potential entity type of a query term or set of query terms. An app-specific rule 252 defines the types of entity types that it can receive and how to represent those entity types in a function ID 120.

The app-specific rules-based module 282 utilizes the templates and definitions defined in an app-specific rule to construct an unparameterized function ID 120. An unparameterized function ID 120 is a function ID 120 that does not have one or more parameter fields populated with a parameter (e.g., an app-specific entity). In a specific example, a query parse 110 may identify an entity "thai food" having an entity type of "cuisine type." Additionally, an example application, "exampleapp" may offer a function that allows a user to search by cuisine type. In this example, the schema of the exampleapp application receives cuisine types using the following parameter field: "cuisine_ID=" and receives numerical values in the cuisine_ID parameter field. Thus, an app-specific rule 252 for the exampleapp application may result in the following unparameterized function ID 120: func://exampleapp:search?cuisine_ID[cuisine_ID]. An app-specific rules-based module 282 determines one or more values (e.g., "slugs") with which to parameterize the unparameterized function ID 120 based on the contents of a query parse 110.

In some implementations, the app-specific rules-based module 282 determines the slugs with which to parameterize the function ID 120 based on the contents of a query parse 110 and the knowledge base 242. In these implementations, the app-specific rules-based module 282 that generated the unparameterized function ID 120 identifies a query term or combination of query terms that resulted in the inclusion of a parameter field in the unparameterized function ID 120. In some of these implementations, the app-specific rules-based module 282 identifies the query term or combination of query terms based on the entity type that the app-specific rule 252 identifies as corresponding to the parameter field that was included in the function ID 120. As the query parse 110 identifies the query term or combination of query terms along with the corresponding entity type, the app-specific rules-based module 282 can identify the query term or combination of query terms from the query parse 110. The app-specific rules-based module 282 can then query the knowledge base 242 with the identified query term or combination of query terms and an identifier of the application to which the app-specific rules-based module 282 corresponds. The knowledge base 242 returns a value that is indicative of the query term or combination of query terms which is understood by the application. For example, if the example software application discussed above, "exampleapp," receives a numerical value indicating a cuisine type (cuisine ID), the knowledge base 242 can identify the numerical value which corresponds to an input cuisine type (e.g., "Thai Cuisine"->"4321"). In other words, the app-specific rules-based module 282 can leverage the knowledge base 242 to translate the query terms into a value (e.g. a "slug") that is understood by the application when inserted in a parameter field of an access mechanism. Drawing from the example above, the app-specific rules-based module 282 that generates function IDs 120 for the "exampleapp" software application may generate the following function ID 120 given the search query "thai food": func://exampleapp:search?cuisine_ID=4321. In the event there is more than one parameter field defined in the unparameterized function ID, the app-specific rules-based module 282 can identify values (e.g., slugs) with which to populate the parameter fields defined in the function ID 120. In the event an app-specific rules-based module 282 receives multiple query parses 110, the app-specific rules-based module 282 can attempt to generate a function ID 120 for each query parse 110.

In some implementations, each individual app-specific rule 252 defines the entity types that the rule 252 can process. Thus, if the app-specific rules 252 utilized by a particular app-specific rules-based module 282 cannot process the entity types defined in a particular query parse 110, the app-specific rules-based module 282 does not generate a function ID 120 for that particular query parse 110. Each app-specific rules-based module 282 returns the function IDs 120 which it generated to the rules-based controller 280. The rules-based controller 280 outputs the generated function IDs 120 to the scoring module 222. An example of an app-specific rule 252 is provided in Appendix B. In the example of Appendix B, the app-specific rule 252 is used to generate function IDs 120 for the IMDB software application by IMDB Inc. In particular, the example rule is used to generate function IDs 120 to access the "movie search" functionality of the IMDB software application. The template defined therein receives a movie tag and includes instructions that can identify a title if a matching slug is found or otherwise uses a term in the "titleId" field if a matching slug is not identified. It is noted that the rule of Appendix B may also be used to generate an application access mechanism (i.e., an application resource identifier).

In some implementations, the rules-based controller 280 determines and outputs an initial score for each of function IDs 120 generated by the app-specific rules-based module 218. The initial score of a function ID 120 can be a numerical value indicating a relative quality of the function ID 120 given the query parse 110 used to generate the function ID 120. In some of these implementations, the initial score is a function of the entity scores of the entity types (defined in the query parse 110) that were used to generate the function ID 120. Additionally or alternatively, the initial score is a function of the percentage of the entity types that were used to generate the function parse. For instance, if a query parse 110 was based on a search query containing five non-stop word query terms (e.g., cheap thai food in Mountain View) and three entity types (e.g., "cheap"=price attribute, "thai food"=cuisine type, and "Mountain View"=city name) and the function ID 120 only incorporated two of the entity types (e.g., "func://example-app:search?cuisine_ID=4321&loc=mountain_view"), the initial score may be 0.667, as only two out of three possible entity types were used to generate the function ID 120. In this example, the initial score may be adjusted according to the entity scores of the entity types used to generate the function ID 120. For instance, the rules-based controller 280 may multiply the initial score by the entity scores of each entity type used to generate the function ID 120. For each function ID 120 that an app-specific rules-based module 282 generates, the rules-based controller 280 may associate the initial score with the function ID 120 and outputs the function ID 120 with the associated initial score. In other implementations, each individual app-specific rules based modules 282 determines the initial scores of the function IDs 120 generated by the app-specific rules based module 282.

An example of an output of the rules-based module 218 is provided in Appendix C. In the example of Appendix C, there are two example function IDs 120 that were generated in response to a search query "woody allen." The first function ID is "func://tripAdvisorCityInfoPage?city=allen, pa", which has a low initial score of 0.05 as the query term "woody" was not incorporated into the function ID and the entity score of "allen" was relatively low. The second function ID 120 is "func://imdbActorInfo?actorId=nm0000095", which has a much higher score of 0.7. In the second example function ID 120, the actorID "nm0000095" identifies the actor "Woody Allen." Thus, the initial score is much higher. Each function ID may have additional features associated therewith, as shown in Appendix C. The example of Appendix C is provided for example only.

The set generation module 220 receives one or more query parses 110 and outputs a consideration set of function IDs 120 based on the query parses 110 and the contents of a record data store 260. The record data store 260 stores records 262. The records 262 can include any suitable data that relates to an underlying document (e.g., a crawled state of a software application). For purposes of explanation and example, the records 262 are assumed to describe states of applications. The exact contents of the records 262, however, may vary without departing from the scope of this disclosure.

Figure 2E:
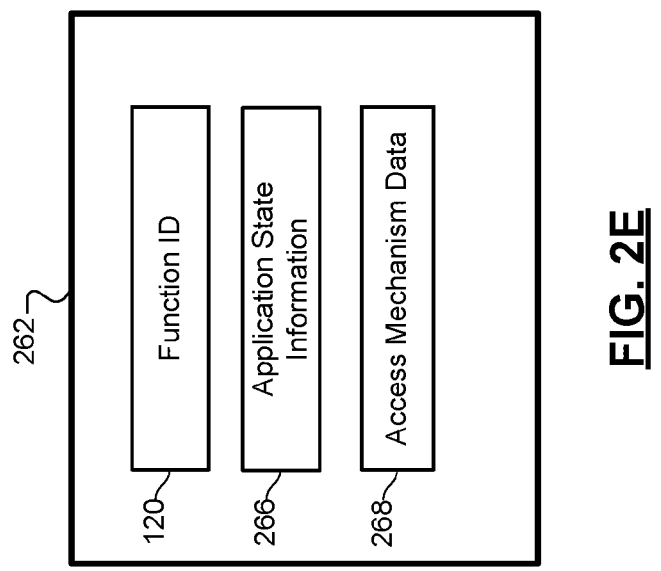
FIG. 2E is a schematic illustrating an example record used to store information related to a state of a software application.

FIG. 2E illustrates an example record 262. An example record 262 can include a function ID 120, application state information 266, and access mechanism data 268. The record 262 may include data related to a function of a software application and/or the state of the software application resulting from performance of the function. The record data store 260 includes a plurality of records 262 having a similar structure as the record 262. Put another way, the record data store 260 may include a plurality of records 262 having a function ID 120, application state information 266, and access mechanism data 268 (e.g., one or more application access mechanisms, one or more web access mechanisms, one or more application download addresses, and/or one or more scripts).

The function ID 120 may be used to identify the record 262 among the other records 262 included in the record data store 260. The function ID 120 can also be used to access a state of an application. Put another way, the function ID 120 can be used to generate or lookup one or more access mechanisms that access a state of a software application, whereby the record 262 in which function ID 120 is stored defines features of the state of the software application. As previously discussed, a function ID 120 may be a string alphabetic, numeric, and/or symbolic characters (e.g., punctuation marks), a human-readable string that describes the state of the application, or a string having a structure of a resource identifier. In the latter implementations, a function ID 120 may utilize any suitable namespace (e.g., http:// or func:/).

In the illustrated example, the record 262 includes access mechanism data 268. The access mechanism data 268 can include one or more access mechanisms and/or one or more instructions that define a manner by which one or more access mechanisms may be derived from the function ID 120 defined in the record 262. Put another way, the access mechanism data 268 can include access mechanisms for accessing the state of the software application or a data structure and/or instructions for obtaining such access mechanisms using the function ID 120 defined in the record 262. In implementations where the access mechanism data 268 is used to generate access mechanisms, a lookup table can explicitly list the access mechanisms that correspond to the function ID 120. Similarly, instructions can define how to translate a function ID 120 into an application resource identifier, a web resource identifier, and/or a script. For example, the user device 100 may use the different access mechanisms (e.g., a first application access mechanism for accessing an IOS edition of a software application, a second application access mechanism for accessing an ANDROID edition of the software application, and/or web access mechanism for accessing a web edition of the software application) to retrieve similar information, play the same song, or play the same movie. The access mechanism data 268 may further include an application download addresses that indicates locations where the native applications referenced in the application access mechanisms can be downloaded. In some implementations, access mechanism data 268 can include a script containing one or more instructions for accessing a state of an application (e.g., a script). In such implementations, the instructions can be used to access states of software applications via native application editions that are not accessible by application resource identifiers. In particular, the instructions can cause at least one of a search application executing on the user device 100 or operating system of the user device 100 to launch the native application and perform operations to access a specific state or function of the software application.

The application state information 266 may include data that describes an application state that a software application is set according to the access mechanism(s) described above. Additionally, or alternatively, the application state information 266 may include data that describes the function performed according to the access mechanism(s) included in the record 262. The application state information 266 may include a variety of different types of data. For example, the application state information 266 may include structured, semi-structured, and/or unstructured data. The search system 200 may collect, extract, and/or infer the application state information 266 from documents retrieved from remote data sources, such as digital distribution platforms, application descriptions, blogs, application reviews, or other sources that can be accessed via the network 150. Additionally, or alternatively, the application state information 266 may be manually generated data. The search system 200 may update the application state information 266 in any record 262 so that up-to-date search results 130 can be provided in response to a search query 102.

In some examples, the application state information 266 may include data that may be presented to the user by a software application when an instance of an edition of the software application is set in the application state defined by the access mechanism data 268. For example, if one of the access mechanism(s) is an application access mechanism, the application state information 266 may include data that describes a state of the native application after the user device 100 has performed the one or more operations indicated in the application access mechanism. In one example, if the record 262 is associated with a shopping application, the application state information 266 may include data that describes products (e.g., names and prices) that are shown when the shopping application is set to the application state defined by the access mechanism data 268. As another example, if the record 262 is associated with a music player application, the application state information 266 may include data that describes a song (e.g., name and artist) that is played when the music player application is set to the application state defined by the access mechanism data 268.

The types of data included in the application state information 266 may depend on the type of information associated with the application state and the functionality defined by the access mechanism(s). In one example, if the record 262 is for an application that provides reviews of restaurants, the application state information 266 may include information (e.g., text and numbers) related to a restaurant, such as a category of the restaurant, reviews of the restaurant, and a menu for the restaurant. In this example, the access mechanism data 268 may cause the application (e.g., a web or native application) to launch and retrieve information for the restaurant (e.g., using a web browser application or one of the native applications installed on the user device 100). As another example, if the record 262 is for a media-related software application that plays music, the application state information 266 may include information related to a song, such as the name of the song, the artist, lyrics, and listener reviews. In this example, the access mechanism(s) may cause a user device to launch an edition of the software application and play the song described in the application state information 266.

The application state information 266 may further define keywords relating to the document described by the record 262. For instance, the application state information 266 may include any text found in the document (e.g., the text appearing in a web page or at a state of a native application). The application state information 266 may further include entity information, such as entity types that correspond to the state of the application defined by the record 262.

The set generation module 220 identifies a consideration set of records based on the search query 102 and/or the one or more query parses 110. The consideration set of records may refer to the records 262 identified from the record data store 260 based on the search query 102 and/or the one or more query parses 110. The contents of the records 262 of the record data store 260 may be indexed in inverted indexes. In some implementations, the set generation module 220 utilizes the Apache Lucene software library by the Apache Software Foundation to identify records from the inverted indexes. The set generation module 220 may search the inverted indexes to identify records 262 containing one or more of the query terms of the search query 102 and/or query parses 110. Additionally, the set generation module 220 can search the inverted indexes for records 262 that relate to entity types defined in the query parses 110. As the set generation module 220 identifies records 262, the set generation module 220 can include the function ID 120 of each identified record 262 in the consideration set. Further, in some implementations, the set generation module 220 may determine an initial score of the record with respect to the search query 102. The initial score may indicate how well the contents of the record 262 matched the search query and/or the query parses 110. For example, the initial score may be a function of the term frequency-inverse document frequency (TF-IDF) values of the respective query terms. The initial score may be based on other suitable factors as well.

The scoring module 222 receives the generated function IDs 120 from the rules-based module 218 and the identified function IDs 120 from the set generation module 220 and determines a result score for the received function IDs 120. A result score is a score associated with a function ID 120 indicating the relevance of the application state corresponding to the function ID 120 given the search query 102 and/or the context parameter 104. In some implementations, the scoring module 222 may determine a result score for each of the function IDs 120 received from the rules-based module 218 and/or the set generation module 220. The result scores associated with a function ID 120 may indicate the relative rank of the function ID 120 among other function IDs 120 generated by the rules-based module 218 or identified by the set generation module 220. For example, a greater result score may indicate that a function ID 120 is more relevant to the received search query 102 than a function ID 120 having a lesser score. The relevance of a function ID 120 may refer to the relevance of the state of the application to which the function ID 120 corresponds.

The information conveyed by the search results 130 may depend on how the result scores are calculated by the scoring module 222. For example, when the result scores indicate the relevance of a state of a software application to the search query 102, the popularity of the state, or other properties of the state may influence the result score. In such a scenario, the function IDs 120 corresponding to more popular states may have higher scores than function IDs corresponding to less popular states. In these implementations, search results 130 corresponding to the higher scored function IDs 120 may be displayed in a larger card in a search engine results page (SERP) and/or may appear higher in the SERP when rendered by a user device 100. A SERP is a graphical user interface that a user device 100 displays. A SERP displays the search results 130. In some implementations, individual search results can be displayed in cards. In another example, function IDs 120 corresponding to states that match better with the search query 102 than function IDs 120 that correspond to other states may have higher result scores as well. In these scenarios, the search results 130 corresponding to these function IDs 120 may be displayed more prominently in the SERP (e.g., displayed in a larger card and/or appearing higher in the SERP).

The scoring module 222 may generate result scores of function IDs 120 in a variety of different ways. In some implementations, the scoring module 222 generates a result score of a function ID 120 is based on one or more scoring features. The scoring features may be associated with the function ID 120 and/or the search query 102. In the example of FIG. 2, the function IDs 120 are received from different sources and are obtained in different manners. In this way, generated function IDs 120 may have different types of scoring features associated therewith than identified function IDs 120. Examples of scoring features include, but are not limited to, record scoring features, query scoring features, record-query scoring features, and function ID scoring features.

A function ID scoring feature may be based on determinations made with respect to a generated function ID. For example, function ID scoring features may be based on how well a generated function ID 120 incorporates the entity types defined in a query parse 110 on which the function ID 120 was based and/or how many entity types were used to generate the function ID. For example, a first example function ID scoring feature may be a Boolean value indicating whether a generated function ID 120 corresponds to a function implicated by the search query 102. Another example function ID scoring feature may be a value indicating how many entity types were used to generate the function ID. Another example function ID scoring feature may indicate a ratio of the number of entity types defined in the query parse 110 that was used to generate the function ID to the number of entity types that were used to generate the function ID 120. Another function ID scoring feature may indicate a value that is based on the entity scores of the entity types used to generate the function ID 120. Yet another example function ID scoring feature may indicate the initial score of the function ID 120. The function ID scoring features may include additional or alternative features without departing from the scope of the disclosure.

A record scoring feature may be based on any data associated with a record 262 corresponding to an identified function ID 120. For example, record scoring features may be based on any data included in the application state information 266 of the record 262. Example record scoring features may be based on metrics associated with a person, place, or thing described in the record 262. Example metrics may include the popularity of a place described in the record 262 and/or ratings (e.g., user ratings) of the place described in the record 262. For example, if the record 262 describes a song, a metric may be based on the popularity of the song described in the record 262 and/or ratings (e.g., user ratings) of the song described in the record 262. The record scoring features may also be based on measurements associated with the record 262, such as how often the record 262 is retrieved during searches and how often links generated based on the record 262 are selected by a user. Record scoring features may also be based on whether the record 262 includes an access mechanism that leads to a default state or a deeper state of a native application.

A query scoring feature may include any data associated with the search query 102. For example, query scoring features may include, but are not limited to, the number of words in the search query 102, the popularity of the search query 102, and the expected frequency of the words in the search query 102. A record-query scoring feature may include any data generated based on data associated with both the record 262 that stores an identified function ID 120 and the search query 102 that resulted in identification of the function record 262 by the set generation module 220. For example, record-query scoring features may include, but are not limited to, parameters that indicate how well the terms of the search query 102 match the terms of the application state information 266 of the identified function ID 120 and/or the initial score of the function ID 120.

The scoring module 222 may generate a result score for a function ID 120 based on at least one of the function ID scoring features, the record scoring features, the query scoring features, and the record-query scoring features. In some examples, the scoring module 222 may include one or more machine learned models (e.g., a supervised learning model) configured to receive one or more scoring features. The one or more machine learned models may generate result scores based on at least one of the function ID scoring features, the record scoring features, the query scoring features, and the record-query scoring features. For example, the scoring module 222 may pair the search query 102 with each function ID 120 and calculate a vector of features for each (query, function ID) pair. The vector of features may include one or more function ID scoring features, one or more record scoring features, one or more query scoring features, and one or more record-query scoring features. In some implementations, the scoring module 222 can normalize the scoring features in the feature vector. As different function IDs 120 have different features (e.g., generated function IDs 120 have a different set of pertinent scoring features than identified function IDs 120), the scoring module 222 can generate feature vectors that have fields for all possible scoring features. In these implementations, the scoring module 222 can set the non-pertinent features to a null value or zero. For example, in a feature vector corresponding to a generated function ID 120, the record scoring features and the record-query scoring features can be set equal to null or zero. In a feature vector corresponding to an identified function ID 120, the scoring module 222 can set the function ID scoring features equal to null or zero. In this way, the feature vectors of function IDs 120 have the same set of features, despite the function IDs 120 not having the same types of features pertaining thereto.

The scoring module 222 may then input the feature vector of a function ID 120 into a machine-learned regression model to calculate a result score for the function ID 120. In some examples, the machine-learned regression model may include a set of decision trees (e.g., gradient boosted decision trees). Additionally or alternatively, the machine-learned regression model may include a logistic probability formula. In some implementations, the machine learned task can be framed as a semi-supervised learning task, where a minority of the training data is labeled with human curated scores and the rest are used without human labels. The machine-learned model outputs a result score of the function ID 120. The scoring module 222 can calculate result scores for each of the function IDs 120 that the scoring module 222 receives. The scoring module 222 associates the result scores with the respective function IDs 120 and outputs the scored function IDs to the result processing module 214.

As will be discussed, the result scores associated with the function ID 120 may be used in a variety of different ways. The result processing module 214 and/or the user device 100 may rank the function IDs 120 or search results 130 resulting from the function IDs 120 based on the result scores associated with the function ID 120. In examples where the user device 100 displays the search results 130 as a list, the user device 100 may display the links having larger result scores nearer to the top of the SERP (e.g., near to the top of the screen) and links having lesser result scores towards the bottom of the SERP (e.g., off screen).

Figure 2F:
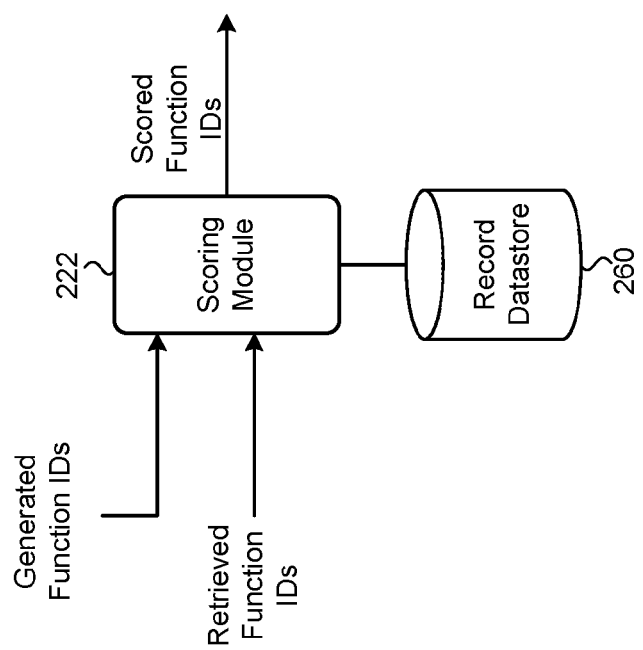
FIG. 2F is an example data flow of a scoring module.

Referring to FIG. 2F, the results processing module 214 receives scored function IDs 120 from the search module 212 and generates search results 130 based on the scored function IDs 120. The generated search results 130 may be encoded in a container, such as a hyper-text markup language (HTML) document that can be embedded in another HTML document (e.g., via an iFrame) or a Java script objection notation (JSON) object. The search results 130 may include a plurality of result objects. Each result object represents an individual search result. An individual search result may correspond to a state of a software application.

For instance, an individual search result may link to a specific page of a software application (e.g., a specific song or album on a media streaming software application or a specific blog post on a blogging software application) or to a function (e.g., a flight booking function of a travel application or a restaurant finding function of a crowd-sourced reviewing application). A result object can contain data and instructions, that when rendered by a user device 100, the result object can be presented as a displayed search result that includes one or more user selectable links. A result object can include a function ID 120 and/or one or more access mechanisms. In the former scenario, a user device 100 utilizes the function ID 120 to determine the one or more access mechanisms (e.g., a URL, one or more application resource identifiers, and/or a script). A user selectable link, when selected (e.g., pressed on or clicked on) by a user, instructs the user device 100 to access the resource identified by the underlying access mechanism(s).

In operation, the results processing module 214 receives the scored function IDs 120 and may select the function IDs 120 on which the result processing module 214 bases the search results 130. In some implementations, the results processing module 214 ranks the function IDs 120 according to their respective results scores. The rankings of the function IDs 120, at least in part, dictates the order in which the corresponding search results 130 are displayed in a SERP. Further, the results processing module 214 may exclude any function IDs 120 not having a requisite result score from the search results 130. The results processing module 214 can then generate result objects for each of the ranked/selected function IDs 120.

In generating the result objects, the results processing module 214 can utilize a result object template to generate a result object. A result object template can define the layout of a displayed search result (e.g., the format of a card that appears in the SERP). The results processing module 214 populates fields in a result object template with data pertaining to the function ID 120. For instance, the results processing module 214 can add visual data (e.g., icons and screen shots), textual data (e.g., titles, descriptions, and ratings), and one or more access mechanisms in a result object. The results processing module 214 can generate/ retrieve the access mechanisms to include in a result object template using the function ID 120. In some implementations, the function ID 120 may map to one or more access mechanisms. In these implementations, the results processing module 214 can utilize a lookup table and/or a set of conversion rules to convert a function ID to corresponding access mechanisms. The lookup table may define the namespace used by an access mechanism to access certain editions of an application. For example, if a function ID begins with the following namespace func://exampleapp, the lookup table may identify the following namespaces: www.exampleapp.com to access the web edition of the exampleapp application, android.exampleapp:// to access the ANDROID edition of the application, and exampleapp:// to access the IOS edition of the application. The conversion rules may define instructions that define the manner by which results processing module 214 can translate the tail portion of the function ID 120. For instance, a function ID 120 may be: func://exampleapp:search?cuisine_ID=4321. In this example, the conversion rules may instruct the results processing module 214 to use the tail portion in the web resource identifier after a forward slash character (e.g., www.exampleapp.com/search?cuisine_ID=4321) but to use a "." character before the tail portion in the application access mechanisms (e.g., android.exampleapp://search?cuisine_ID=4321 and exampleapp://search?cuisine_ID=4321.) The conversion rules may be specific to a software application and may depend on what type of edition of the software application the access mechanism is used to access. For example, a web access mechanism has a different format than an ANDROID application access mechanism, which may differ from an IOS access mechanism. Further, some native applications are not accessible by a resource identifier. In these implementations, the conversion rules may define one or more scripts that can be used to access the native application editions of a software application. In the case of an identified function ID 120, the results processing module 214 can obtain the access mechanism(s) from the access mechanism data 268 of the record 262 corresponding to the function ID 120. The results processing module 214 can insert the access mechanism(s) in an access mechanism field of a result object template.

The results processing module 214 can include visual data, such as a file containing an image of icon of an application or an image of a screen shot of the application, in fields defined in the result object template that receive visual data. Additionally, the results processing module 214 can add textual data, such as a title of the application, a description of the state of the application, and/or any other suitable information. In the case that the function ID 120 is an identified function ID 120, the results processing module 214 can populate the fields in the result object template using the application state information 266 defined in the application record 262 corresponding to the function ID 120. In the case that the function ID 120 is a generated function ID 120, the results processing module 214 can populate the fields in the result object template using information stored in the app-specific rule 252 and/or stored data corresponding to the software application. In some implementations, an app-specific rule 252 that was used to generate a function ID 120 may identify visual data to include in a result object (e.g., a file that contains an image of an icon of an application). Similarly, the app-specific rule 252 may define textual data to be included in a displayed search result. Alternatively, the visual and textual data that the results processing module 214 includes in a result object can be stored in a record 262 that is specific to the software application to which the generated function ID 120 corresponds. For instance, if the function ID 120 corresponds to a travel application and leverages the flight booking function of the travel application, the results processing module 214 may retrieve a record 262 that stores a file containing the icon of the travel application (or an address of the file) and textual data describing the flight booking function of the travel application. In these implementations, the results processing module 214 can retrieve the record 262 corresponding to the generated function ID 120 and can populate the result object template with the visual and/or textual data contained in the record 262.

Upon generating the result objects, the results processing module 214 can transmit the search results 130 to the user device 100 that provided the search query 102. In some implementations, the results processing module 214 encodes the result objects into a container, such as an HTML document or a .json file, thereby obtaining the search results. The results processing module 214 can provide the search results to a downstream component or downstream device, which in turn transmits the search results 130 to the user device 100 that provided the search query 102. In other implementations, the results processing module 214 transmits the search results 130 to the user device 100 that provided the search query 102.

Figure 3:
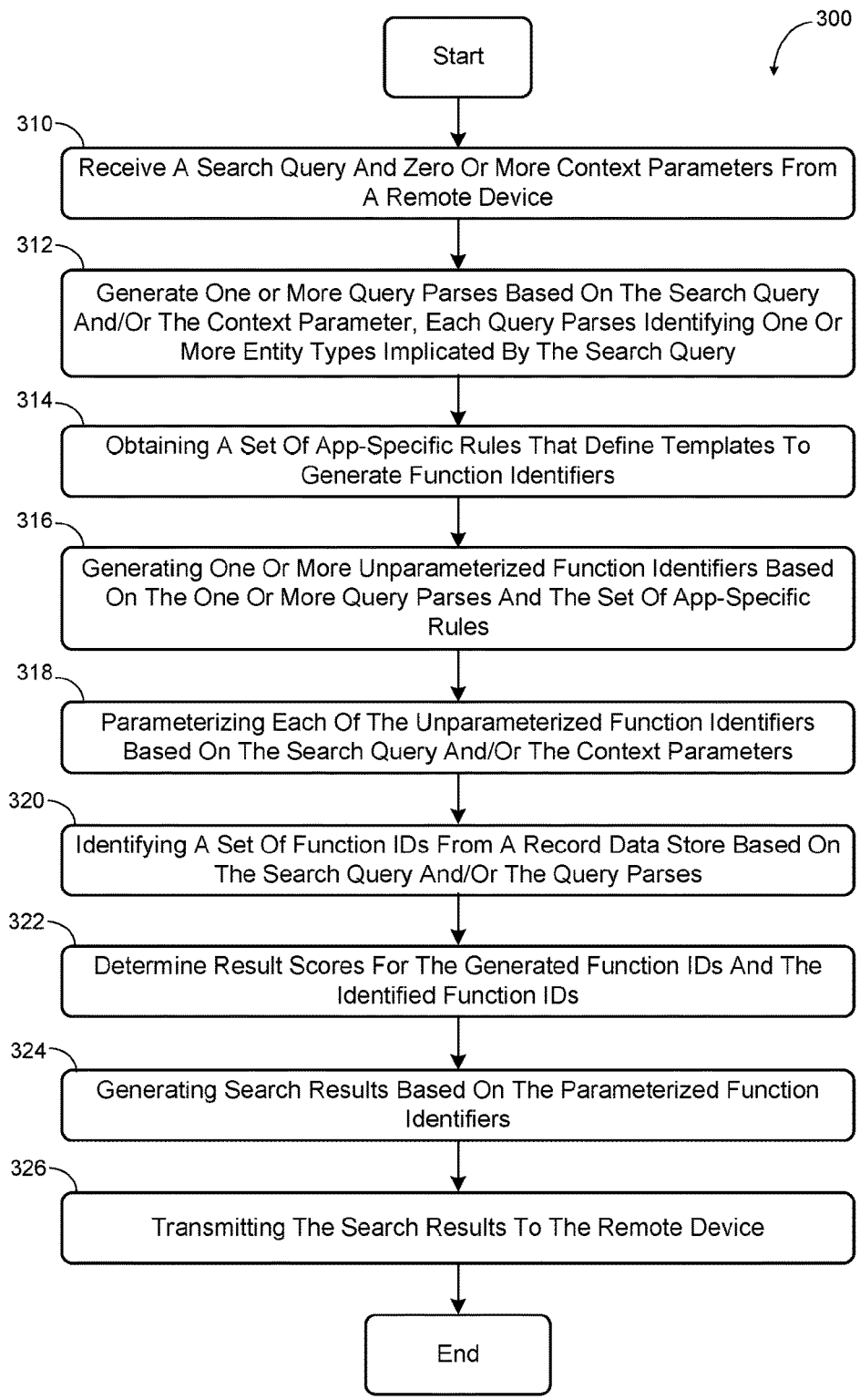
FIG. 3 is a flow chart illustrating an example set of operations for a method for processing a search query.

Referring now to FIG. 3, an example set of operations of a method 300 for processing a search query 102 is illustrated. For purposes of explanation, the method 300 is explained with respect to the search system 200 discussed above. While other components can be used, reference is made to the components discussed above for purposes of explanation. The method 300 may be combined with other methods which generate search results 130.

At operation 310, the query analysis module 216 receives a search query 102 and zero or more query parameters 104 from a remote device. In some implementations, the remote device is a user device 100. In other implementations, the remote device is a partner device. A partner device is a device associated with a third party that utilizes the search system 200 to respond to search queries 102 received from user devices 100. In these implementations, the partner device receives a search query 102 (and possibly one or more context parameters 104) from a user device 100 and provides the search query 102 to the search system 200. The search system 200 processes the search query 102 and can provide the search results 130 to the partner device or the user device 100 directly.

At operation 312, the query analysis module 216 generates one or more query parses 110 based on the search query 102 and/or the context parameters 104. In some implementations, the query analysis module 216 can leverage the knowledge base 242 to identify potential entity types implicated by the search query 102 and/or context parameters 104. As previously described, a portion of the knowledge base 242 may be structured according to an ontology that associates entities to entity types, and entity types to other entity types. Using this portion, the query analysis module 216 can query the knowledge base 242 (or an indexed entity table) with each query term or combination of query terms contained in the search query 102 and/or the context parameters 104 to identify potential entity types implicated by the search query 102. Further, the query analysis module 216 may utilize one or more parsing rules to generate query parses 110 that indicate potential interpretations of the search query 102. The query parses 110 may be structured in a parse tree. The query analysis module 216 outputs the query parses 110 to the rules-based module 218.

At operation 314, the rules-based module 218 obtains a set of app-specific rules 252. As previously described, an app-specific rule defines at least one template for generating a function ID 120. In some implementations, the rules-based module 218 may include a plurality of app-specific rules-based modules 282 that respectively correspond to a different software application. In other words, each app-specific rules-based module 282 utilizes a specific set of app-specific rules 252 that are defined for a corresponding software application. In some implementations, the app-specific rules 252 are stored in a rules data store 250. Each app-specific rules-based module 282 can utilize a set of app-specific rules 252 pertaining to the corresponding software application.

At operation 316, the rules-based module 218 can generate one or more unparameterized function IDs 120 based on the one or more query parses 110 and the set of app-specific rules 252, provided at least one of the app-specific rules 252 utilized by at least one of the app-specific rules-based module 218 accepts one or more of the entity types defined in at least one of the query parses 110. At operation 318, the rules-based module 218 parameterizes the unparameterized function identifiers based on one or more of the query terms defined in the search query 102 and/or the context parameters 104. The operation of an app-specific rules-based module 282 is described in greater detail with respect to FIG. 4.

Figure 4:
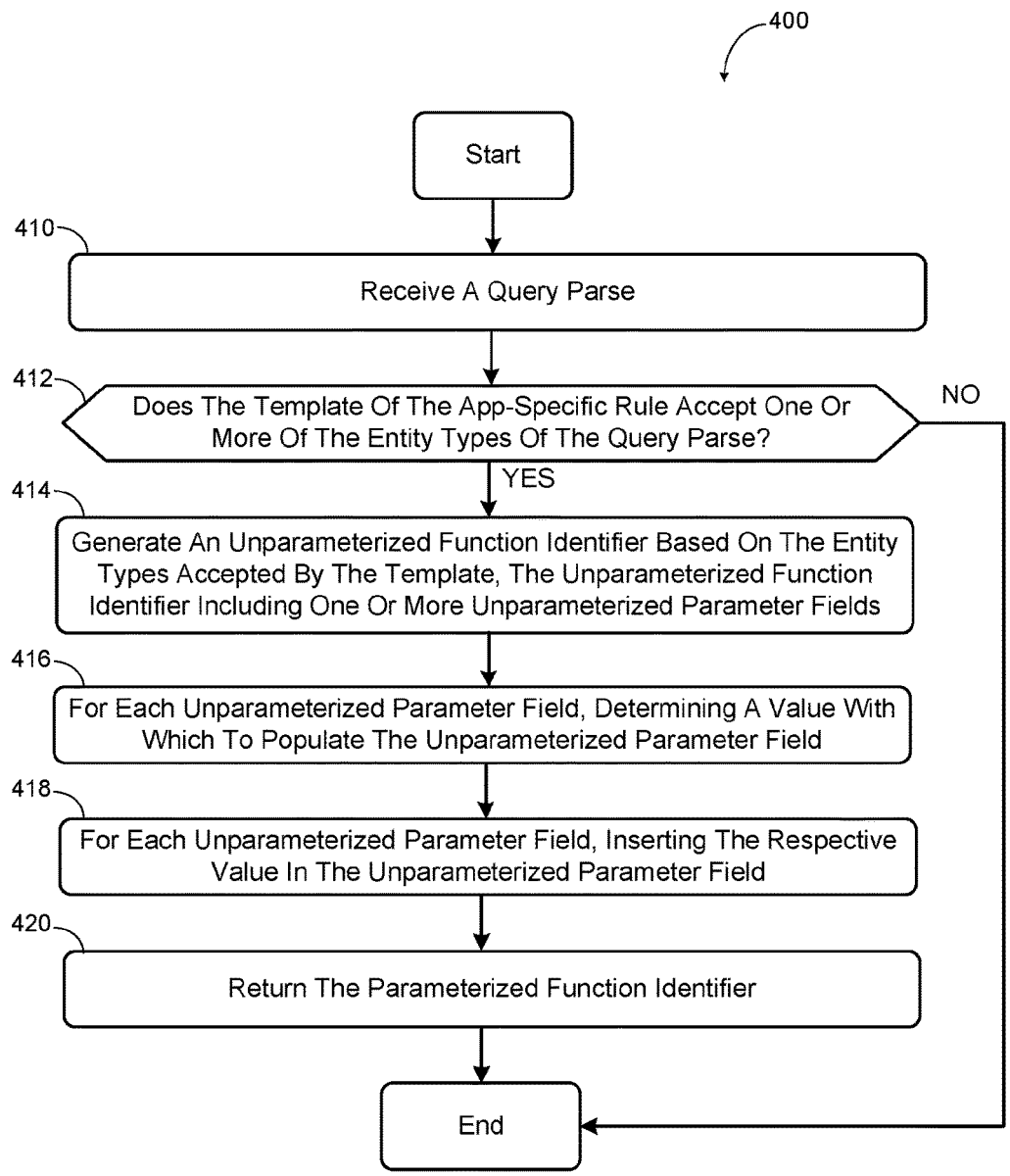
FIG. 4 is a flow chart illustrating an example set of operations for generating a function identifier given a query parse.

FIG. 4 illustrates an example set of operations of a method 400 for generating a set of function IDs 120 given a query parse 110. The method 400 is described with respect to an app-specific rules-based module 282. The operations described in FIG. 4 can be applied across a set of app-specific rules-based module 282, where each app-specific rules-based module 282 is configured to generate function IDs 120 pertaining to a different software application. Further, in some implementations, a single module (e.g., the rules-based module 218) can utilize multiple sets of app-specific rules 252 that correspond to the different software applications.

At operation 410, an app-specific rules-based module 282 receives a query parse 110 from the rules-based controller 280. The rules-based controller 280 may provide more than one query parse 110 to the app-specific rules-based module 282. For purposes of explanation, however, the method 400 is described using a single query parse 110. As previously discussed, a query parse 110 can indicate a potential interpretation of a search query 102. The query parse 110 can indicate a subset of query terms contained in the search query, potential entity types of the query terms and/or combinations of the query terms, and in some implementations, an entity score for each of the potential entity types.

At operation 412, the app-specific rules-based module 282 determines whether a template defined in an app-specific rule 252 accepts any of the one or more entity types defined in the query parse 110. If the template does not accept any of the entity types defined in the query parse 110, the app-specific rules stops executing with respect to the particular query parse 110. For example, a query parse 110 may identify the query term "lax" and may associate a sports entity type with query term. In the event that the template defined in the app-specific rule 252 is configured to generate function IDs 120 corresponding to a travel-related software application, the app-specific rule 252 may instruct the app-specific rules-based module 282 to stop processing the query parse because the travel-related software application does not relate to sports related entities, and therefore, would not receive the term "lax" or "lacrosse" as a parameter. If the template does accept one or more of the entity types defined in the query parse 110 the app-specific rule 252 instructs the app-specific rules-based module 282 to continue processing the query parse 110. For example, a query parse 110 may identify the query term "lax" and may associate an airport code entity type with query term. Assuming that the template defined in the app-specific rule 252 is configured to generate function IDs 120 corresponding to the travel-related software application, the app-specific rule 252 may instruct the app-specific rules-based module 282 to generate a function ID 120 using the template defined therein, whereby the travel-related application may receive the entity "lax" as a parameter. While the minimum number of entity types that are accepted by an app-specific rule 252 is described as having a value of one (i.e., at least one accepted entity types), a rule 252 may require any number of matching entity types in order to generate a function ID 120.

At operation 414, the app-specific rule 252 instructs app-specific rules-based module 282 to generate an unparameterized function identifier 120 based on the entity types accepted by the template. The unparameterized function identifier 120 identifies the software application to which it corresponds and includes one or more unparameterized parameter fields. Both the structure of the function identifier 120 (e.g., "func://travelapp:") and the unparameterized parameter fields (e.g., "from:[airport_code]", "to:[airport_code]", "departure:[date]" and "trip=[Boolean_round_trip_flap]") are defined by the template defined in the app-specific rule 252. The template may further define a manner by which to construct the function ID 120 (e.g., connect parameter fields using a comma or represent new portions of the function ID with an ampersand). The app-specific rules-based module 282 generates the unparameterized function ID 120 using the template, whereby the app-specific rules-based module 282 can select the parameter fields to include in the unparameterized function ID 120 based on the entity types defined in the query parse 110.

At operation 416, the app-specific rules-based module 282 determines, for each unparameterized parameter field in the unparameterized function ID 120, a value with which to populate the unparameterized parameter field. In some implementations, the app-specific rules-based module 282 determines a slug with which to populate the unparameterized parameter field based on one or more of the query terms defined in the search query 102 or the query parse 110. A slug can refer to a value that can parameterize a function ID that is in human-readable format. For instance, if a function ID 120 of a travel related application can be parameterized with the value "lax," then the term "lax" may be referred to as a "slug." The app-specific rules-based module 282 can determine the value with which it can parameterize an unparameterized field of the function ID 120 with by identifying the entity type corresponding to the unparameterized field. For instance, this information may be obtained from metadata pertaining to the function ID 120 or from the app-specific rule 252 used to generate the function ID 120. From the entity type, the app-specific rules-based module 282 can identify the query term or combination of query terms that implicated the entity type. The app-specific rules-based module 282 can query the knowledge base 242 with the identified query term or query terms and an identifier of the software application to which the unparameterized function ID 120 corresponds. The knowledge base 242 returns a value that is known by the software application and that represents the query term or combination of query terms. For instance, if the query contains the query terms "Detroit International Airport" and the software application is a travel related app, the knowledge base may return the value "dtw" or a numerical value representing the airport code (e.g., 1313). At operation 418, the app-specific rules-based module 282 populates the unparameterized fields with the values determined during operation 416. In some implementations, the app-specific rules-based module 282 replaces a placeholder in the unparameterized field with the determined value (e.g., replace "[airport_code]" with the value "dtw," "sfo," or "lax"). In some implementations, the app-specific rules-based module 282 may be further configured to determine an initial score of the function ID 120. For example, the app-specific rules-based module 282 may determine the initial score based on the number of entity types defined in a query parse 110 and the number of entities defined in the query parse 110 were utilized to generate the function ID 120. At operation 420, the app-specific rules-based module 282 returns the parameterized function ID 120 to the rules-based controller 280. The app-specific rules-based module 282 may return more than one function ID 120 if more than one app-specific rule 252 was able to generate a parameterized function ID 120.

Referring back to FIG. 3, at operation 320 the set generation module 220 identifies a set of function IDs 120 from the record data store 260 based on the one or more query terms defined in the search query 102 and/or the query parses 110. The set generation module 220 can search one or more inverted indexes using the query terms to identify records 262 that include state information 266 that includes one or more query terms. The set generation module 220 can include the function IDs 120 stored in the identified records 262 in a set of function IDs 120. In some implementations, the set generation module 220 determines an initial score of each function ID 120 that it includes in the set of function IDs 120. The initial score can indicate a degree to which the search query 102 matches to the contents of the record 262 and/or a quantifiable metric indicating the quality of the matches (e.g., TF-IDF). The set generation module 220 outputs the set of (identified) function IDs to the scoring module 222.

At operation 322, the scoring module 222 determines result scores for each of the received function IDs 120 (both generated function IDs 120 and identified function IDs 120). In some implementations, the generated function IDs 120 and the identified function IDs 120 are assigned initial scores by the rules-based module 218 and the set generation module 220, respectively. In some implementations, the scoring module 222 generates a feature vector for each function ID 120. As previously discussed a feature vector can indicate one or more function ID scoring features, one or more record scoring features, one or more query features, and/or one or more record-query scoring features. The scoring module 222 can normalize the feature vectors of the function IDs 120 so that the feature vectors define the same set of features. In some implementations, the scoring module 222 feeds the feature vectors of the function IDs 120 into a machine-learned scoring model. The machine-learned scoring model generates a result score for each of the function IDs 120. The scoring module 222 outputs the scored function IDs 120 to the results processing module 214. The result scores may be calculated in other suitable manners as well, including basing the result scores of function IDs on the initial score.

At operation 324, the results processing module 214 generates search results 130 based on the scored function IDs 120. In some implementations, the results processing module 214 ranks the scored function IDs 120 based on their respective result scores and/or selects function IDs 120 for inclusion in the search results 130 based on their respective results scores. Additionally, the results processing module 214 generates result objects corresponding to one or more of the scored function IDs. For each selected function ID 120, the results processing module 214 can generate or retrieve access mechanisms based on the selected function ID. In the case of a function ID 120 generated by the rules-based module 218, the results processing module 214 can transform the function ID 120 into one or more access mechanisms using the function ID 120 and one or more instructions that define a manner by which access mechanisms are translated from a function ID 120 corresponding to a particular software application. In the case of a function ID 120 identified by the set generation module 220, the results processing module 214 can retrieve the access mechanisms from the access mechanism data 268 of the record 262 corresponding to the function ID 120. The results processing module 214 can obtain a result object template and populate the result object template with the generated access mechanism(s). Further, the results processing module 214 can include textual data (e.g., descriptions) and/or visual data (e.g., icons) corresponding to the software application defined in the function ID 120 in the result object. The results processing module 214 can also include the textual data (e.g., descriptions) and/or visual data (e.g., screenshots) corresponding to a state of the software application in the result object template. In some implementations, the results processing module 214 obtains the textual data and/or the visual data from a record 262 corresponding to a function ID 120. At operation 326, the results processing module 214 packages the result objects in a container (e.g., HTML document or .json file) and transmits the container (e.g., the search results 130) to the remote device.

The methods 300, 400 of FIGS. 3 and 4 are provided for example. Variations of the methods 300, 400 are contemplated and are within the scope of the disclosure.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus," "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

APPENDIX A

Example Location Parser Algorithm

1. Read location lookup table //identifies all possible place names, their respective latitude and longitude, and popularity value, a popularity value may be indicative of a population or other metrics (e.g., small towns that have lots of tourists may have high popularity values despite a small population)
2. Receive Analyzed Tokens and geolocation context parameter
3. For each Combination Of Tokens {   //Single Tokens and combinations of two or more tokens
4.     If combination of tokens matches one or more locations names in the location lookup table
5.         then:    determine popularity of location from location lookup table
6.                  calculate distance to location based on user device geolocation context parameter and lookup table;
7.                  if popularity >= popularity threshold
                        then: determine confidence value based on popularity // may be hard coded confidence values in lookup table that define confidence values that are based on popularity, e.g., New York may have higher confidence values than a small town or township.
8.                  if distance <= distance threshold
9.                      then: calculate confidence value based on distance
// e.g., confidence value = (distance threshold − distance)/distance threshold
10.                 if popularity < popularity threshold AND distance > distance threshold
11.                     then assign default confidence value // e.g. 0 or relatively small value .1
12.                 generate parsed token based on combination of analyzed tokens and the greatest confidence value and assign a geo location property, with more details about the detected location
13.         else:    if number of analyzed tokens in the combination of tokens == 1 //no location found
14.             then generate a parsed token based on the string of analyzed token and do not assign a confidence value
15.             else discard combination of tokens
16. Combine parsed tokens into a parsed query
17. Output parsed query APPENDIX A-continued

---

Example Synonym Parser

---

1. Read synonym lookup table //synonym lookup table identifies a list of words or phrases, each word or phrase's known synonyms, and a confidence value associated with each word or phrase/synonym pair.
2. Receive Analyzed Tokens
3. For each Combination Of Tokens {     //Single Tokens and combinations of two or more tokens
4.   Lookup combination of tokens in lookup table for any possible for matches
5.   If matches found
6.      then: generate a parsed token using the combination of tokens as the string
7.         For each synonym identified in synonym lookup table
8.            Add a new property defining the synonym and associated confidence value listed in the synonym lookup table
9.      else: if number of analyzed tokens in the combination of tokens == 1 // no synonyms and single token
10.         then: generate a parsed token using the combination of tokens as the string
11.      else: discard combination of tokens
12. Combine parsed tokens into a parsed query
13. Output parsed query Example Cuisine Parser

---

1. Read cuisine lookup table //cuisine lookup table identifies a list of known cuisines (e.g., barbeque), cuisine identifier, and alternate names for the cuisine (e.g., BBQ, bar-b-cue, barbecue).
2. Receive Analyzed Tokens
3. For each Combination Of Tokens {   //Single Tokens and combinations of two or more tokens
4.   Lookup combination of tokens in lookup table for any possible matches
5.   If matches found
6.      then: generate a parsed token using the combination of tokens as the string
7.         Add a new property defining the cuisine identifier and a default confidence value
8.            If the cuisine has alternate names add the alternate names as synonym properties and associate another default confidence value
8.      else: if number of analyzed tokens in the combination of tokens == 1 // no synonyms and single token
9.         then: generate a parsed token using the combination of tokens as the string
10.         else: discard combination of tokens
11. Combine parsed tokens into a parsed query
12. Output parsed query Example Media Content Parser

---

1. Read media content lookup table //media content lookup table identifies a list of known media contents (e.g., movie, song, album), each known media content's associated words or phrases and a confidence value associated with each media content/word or phrase pair.
2. Receive Analyzed Tokens
3. For each Combination Of Tokens {   //Single Tokens and combinations of two or more tokens
4.   Lookup combination of tokens in lookup table for any possible for matches to known media content
5.   If matches found
6.      then: generate a parsed token using the combination of tokens as the string
7.         Add a new property defining the media content and the confidence value associated with the media content/word or phrase pair
8.      else: if number of analyzed tokens in the combination of tokens == 1 // no synonyms and single token
9.         then: generate a parsed token using the combination of tokens as the string
10.         else: discard combination of tokens
11. Combine parsed tokens into a parsed query
12. Output parsed query Example Application Name Parser

---

1. Read application name lookup table // application name lookup table identifies a list of known applications, an application identifier of the application, each known application's associated words or phrases, and a confidence value associated with each application/word or phrase pair.
2. Receive Analyzed Tokens
3. For each Combination Of Tokens {   //Single Tokens and combinations of two or more tokens
4.   Lookup combination of tokens in lookup table for any possible for matches to known application
5.   If matches found

APPENDIX A-continued 6.     then: generate a parsed token using the combination of tokens as the string
7.         Add a new property defining the application ID and the confidence value associated with the application/word or phrase pair
8.       else: if number of analyzed tokens in the combination of tokens == 1 // no synonyms and single token
9.         then: generate a parsed token using the combination of tokens as the string
10.         else: discard combination of tokens
11. Combine parsed tokens into a parsed query
12. Output parsed query

APPENDIX B

```
{
"id": "imdbMovieSearch",
"appId": 11596014,
"urlPattern": "func://imdb.com/title/${titleId}",
"displayTextPattern": "View ${movieName} page",
"deepLinksByEdition": {
        "17879807": {
                "urlPattern":"imdb:///title/${titleId}",
                "platformIds": [2005]
                }
},
"requiredTypeTags": [["imdbMovie"]],
"functionalKeywordTypes": ["imdbMovieKeyword"],
"staticEntityType": "imdbMovie",
"patternMapping":{
        "titleId": {
                "handledTypeMapping":{
                        "imdbMovie": {
                                "handlerType": "dataField",
                                "dataField": "imdbSlug"
                                }
                        }
                },
        "movieName": {
                "handledTypeMapping":{
                        "imdbMovie": {
                                "handlerType": "dataField",
                                "dataField": "name"
                                }
                        }
                }
        }
}
```

APPENDIX C

```
Example output for a search query "woody allen"
{
  "@context": {
    "@vocab": "http://vocab.quixey.com/QUAD-10",
    "@include": [
        "http://vocab.quixey.com/QUAD-99999/ontology/usdirect/v47"
    ]
  },
  "funcUrlResults": [ //Not exhaustive, there may be more results
    {
        "score": 0.05, //Low score comes from not parsing "woody" and low parse confidence
        "featureVector": {
          "parseIsPrefix": False,
          "queryFraction": 0.5,
          "parseConfidence": 0.1,
          "parseIsSuffix": True
        },
        "softProductId": "Trip Advisor",
        "funcUrl": "func://tripAdvisorCityInfoPage?city=allen,pa",
        "ruleId": "Trip Advisor City Info"
    },
    {
        "score": 0.7,
        "featureVector": {
```

APPENDIX C-continued

```
          "parseIsPrefix": True,
          "queryFraction": 1,
          "parseConfidence": 0.7,
          "parseIsSuffix": True
        },
        "softProductId": "Imdb",
        "funcUrl": "func://imdbActorInfo?actorId=nm0000095",
        "grammarId": "Imdb Actor Bio Page"
    }
  ],
  "responseTime": 5
}
```

What is claimed is:

1. A portable device for performing a search, comprising:
a storage that stores a plurality of sets of application specific rules, wherein each of the sets of application specific rules is associated with a respective application, and wherein each of the sets of application specific rules defines a template for generating function identifiers that identify functions of the respective application; and
a search module that:
  obtains a search query,
  identifies at least one entity type indicated by the search query,
  retrieves, from the storage, a first set of application specific rules corresponding to the identified entity type,
  generates at least one unparameterized function identifier using (i) the retrieved first set of application specific rules and (ii) the search query, wherein each identifier of the at least one unparameterized function identifier includes at least one parameter field that (a) corresponds to the at least one entity type but does not (b) indicate a parameter value,
  generates a parameterized function identifier by parameterizing a first identifier of the at least one unparameterized function identifier using the search query, wherein parameterizing the first identifier includes populating a first parameter field of the at least one parameter field with a parameter value based on the search query, and
  generates a search result based on the parameterized function identifier.

2. The portable device of claim 1, wherein the storage stores a knowledge base that indicates relationships (i) between a plurality of entity types, (ii) between a plurality of entities, (iii) between a plurality of application specific entity types, and (iv) between a plurality of application specific entities.

3. The portable device of claim 1, wherein the parameterized function identifier (i) identifies an application and (ii) identifies an access mechanism for accessing a function of the identified application.

4. The portable device of claim 1, wherein, to identify the at least one entity type indicated by the search query, the search module (i) parses the search query to identify at least one query term and (ii) identifies the at least one entity based on the at least one query term.

5. The portable device of claim 1, wherein, to retrieve the first set of application specific rules corresponding to the identified entity type, the search module (i) determines whether the first set of application specific rules defines a template corresponding to the identified entity type and (ii) selectively retrieves the first set of application specific rules based on the determination.

6. The portable device of claim 5, wherein the search module retrieves the first set of application specific rules based on the defined template.

7. The portable device of claim 1, wherein the search module determines the parameter value based on the search query.

8. The portable device of claim 7, wherein, to determine the parameter value, the search module (i) determines a subset of query terms in the search query and (ii) determines, using a knowledge base stored by the storage, the parameter value based on the subset of the query terms.

9. The portable device of claim 8, wherein, to determine the parameter value using the knowledge base, the search module identifies an application specific entity in the knowledge base corresponding to the subset of the query terms.

10. The portable device of claim 1, wherein, to generate the search result, the search module (i) identifies, based on the parameterized function identifier, an access mechanism for accessing a function of an application and (ii) generates a result object based on the identified access mechanism.

11. A method for generating search results, comprising:
storing a plurality of sets of application specific rules, wherein each of the sets of application specific rules is associated with a respective application, and wherein each of the sets of application specific rules defines a template for generating function identifiers that identify functions of the respective application;
obtaining a search query;
identifying at least one entity type indicated by the search query;
retrieving a first set of application specific rules corresponding to the identified entity type;
generating at least one unparameterized function identifier using (i) the retrieved first set of application specific rules and (ii) the search query, wherein each identifier of the at least one unparameterized function identifier includes at least one parameter field that (a) corresponds to the at least one entity type but (b) does not indicate a parameter value;
generates a parameterized function identifier by parameterizing a first identifier of the at least one unparameterized function identifier using the search query, wherein parameterizing the first identifier includes populating a first parameter field of the at least one parameter field with a parameter value based on the search query; and
generating a search result based on the parameterized function identifier.

12. The method of claim 11, further comprising storing a knowledge base that indicates relationships (i) between a plurality of entity types, (ii) between a plurality of entities, (iii) between a plurality of application specific entity types, and (iv) between a plurality of application specific entities.

13. The method of claim 11, wherein the parameterized function identifier (i) identifies an application and (ii) identifies an access mechanism for accessing a function of the identified application.

14. The method of claim 11, wherein identifying the at least one entity type indicated by the search query includes (i) parsing the search query to identify at least one query term and (ii) identifying the at least one entity based on the at least one query term.

15. The method of claim 11, wherein retrieving the first set of application specific rules corresponding to the identified entity type includes (i) determining whether the first set of application specific rules defines a template corresponding to the identified entity type and (ii) selectively retrieving the first set of application specific rules based on the determination.

16. The method of claim 15, wherein retrieving the first set of application specific rules includes retrieving the first set of application specific rules based on the defined template.

17. The method of claim 11, wherein parameterizing the first identifier includes determining the parameter value based on the search query.

18. The method of claim 17, wherein determining the parameter value includes (i) determining a subset of query terms in the search query and (ii) determining, using a knowledge base, the parameter value based on the subset of the query terms.

19. The method of claim 18, wherein determining the parameter value using the knowledge base includes identifying an application specific entity in the knowledge base corresponding to the subset of the query terms.

20. The method of claim 11, wherein generating the search result includes (i) identifying, based on the parameterized function identifier, an access mechanism for accessing a function of an application and (ii) generating a result object based on the identified access mechanism.

* * * * *